(12) United States Patent
Dumitrescu et al.

(10) Patent No.: US 9,769,290 B2
(45) Date of Patent: Sep. 19, 2017

(54) PACKET FLOW CLASSIFICATION

(71) Applicant: Intel Corporation, Santa Clara, CA (US)

(72) Inventors: Cristian Florin F. Dumitrescu, Shannon (IE); Namakkal N. Venkatesan, Hillsboro, OR (US); Pierre Laurent, Quin (IE); Bruce Richardson, Sixmilebridge (IE)

(73) Assignee: Intel Corporation, Santa Clara, CA (US)

( * ) Notice: Subject to any disclaimer, the term of this patent is extended or adjusted under 35 U.S.C. 154(b) by 369 days.

(21) Appl. No.: 14/286,975

(22) Filed: May 23, 2014

(65) Prior Publication Data
US 2015/0341473 A1    Nov. 26, 2015

(51) Int. Cl.
*H04L 12/743* (2013.01)
*H04L 29/06* (2006.01)
*H04L 12/64* (2006.01)

(52) U.S. Cl.
CPC .......... *H04L 69/22* (2013.01); *H04L 12/6418* (2013.01); *H04L 45/7453* (2013.01)

(58) Field of Classification Search
None
See application file for complete search history.

(56) References Cited

U.S. PATENT DOCUMENTS

| | | | | |
|---|---|---|---|---|
| 5,897,637 A | * | 4/1999 | Guha | G06F 17/30949 |
| 6,421,730 B1 | * | 7/2002 | Narad | H04L 45/16 709/236 |
| 7,069,268 B1 | * | 6/2006 | Burns | H04L 45/00 707/770 |
| 2004/0133747 A1 | * | 7/2004 | Coldewey | G06F 12/0862 711/137 |
| 2005/0071335 A1 | * | 3/2005 | Kadatch | G06F 17/30949 |

(Continued)

*Primary Examiner* — Gregory Sefcheck
*Assistant Examiner* — Jenkey Van
(74) *Attorney, Agent, or Firm* — Barnes & Thornburg LLP

(57) ABSTRACT

Technologies for packet flow classification on a computing device include a hash table including a plurality of hash table buckets in which each hash table bucket maps a plurality of keys to corresponding traffic flows. The computing device performs packet flow classification on received data packets, where the packet flow classification includes a plurality of sequential classification stages and fetch classification operations and non-fetch classification operations are performed in each classification stage. The fetch classification operations include to prefetch a key of a first received data packet based on a set of packet fields of the first received data packet for use during a subsequent classification stage, prefetch a hash table bucket from the hash table based on a key signature of the prefetched key for use during another subsequent classification stage, and prefetch a traffic flow to be applied to the first received data packet based on the prefetched hash table bucket and the prefetched key. The computing device handles processing of received data packets such that a fetch classification operation is performed by the flow classification module on the first received data packet while a non-fetch classification operation is performed by the flow classification module on a second received data packet.

24 Claims, 11 Drawing Sheets

(56) References Cited

U.S. PATENT DOCUMENTS

| | | | |
|---|---|---|---|
| 2006/0212658 A1* | 9/2006 | Hrle | G06F 12/0862 |
| | | | 711/137 |
| 2008/0112415 A1* | 5/2008 | Sobaje | H04L 47/10 |
| | | | 370/392 |
| 2009/0216956 A1* | 8/2009 | Ekanadham | G06F 12/0862 |
| | | | 711/137 |
| 2011/0225391 A1* | 9/2011 | Burroughs | G06F 9/3851 |
| | | | 711/216 |
| 2011/0238920 A1* | 9/2011 | Hooker | G06F 12/0862 |
| | | | 711/136 |
| 2012/0131311 A1* | 5/2012 | Chou | G06F 12/0862 |
| | | | 712/207 |
| 2013/0212296 A1* | 8/2013 | Goel | H04L 45/7453 |
| | | | 709/238 |
| 2014/0195545 A1* | 7/2014 | Anand | H04L 45/7453 |
| | | | 707/747 |
| 2015/0288700 A1* | 10/2015 | Bouchard | H04L 67/327 |
| | | | 726/4 |

* cited by examiner

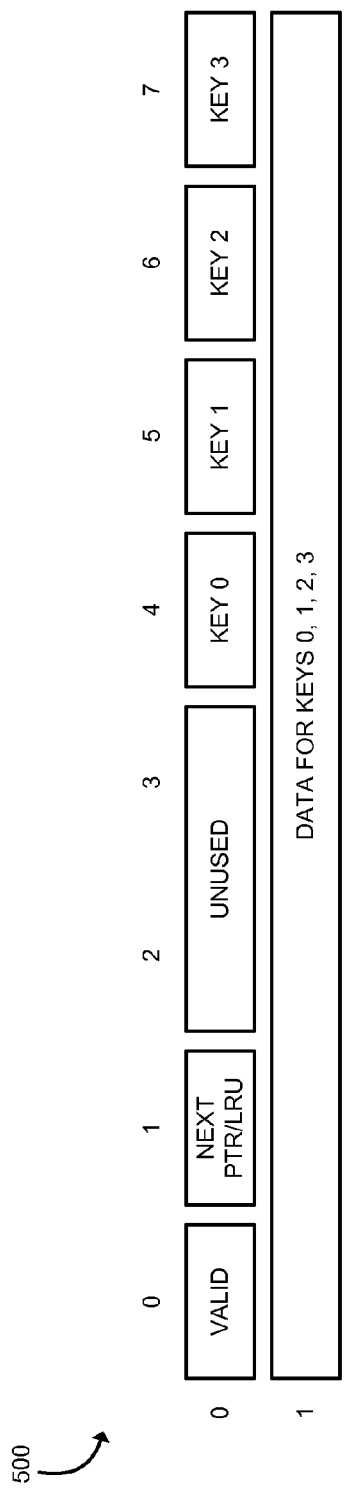
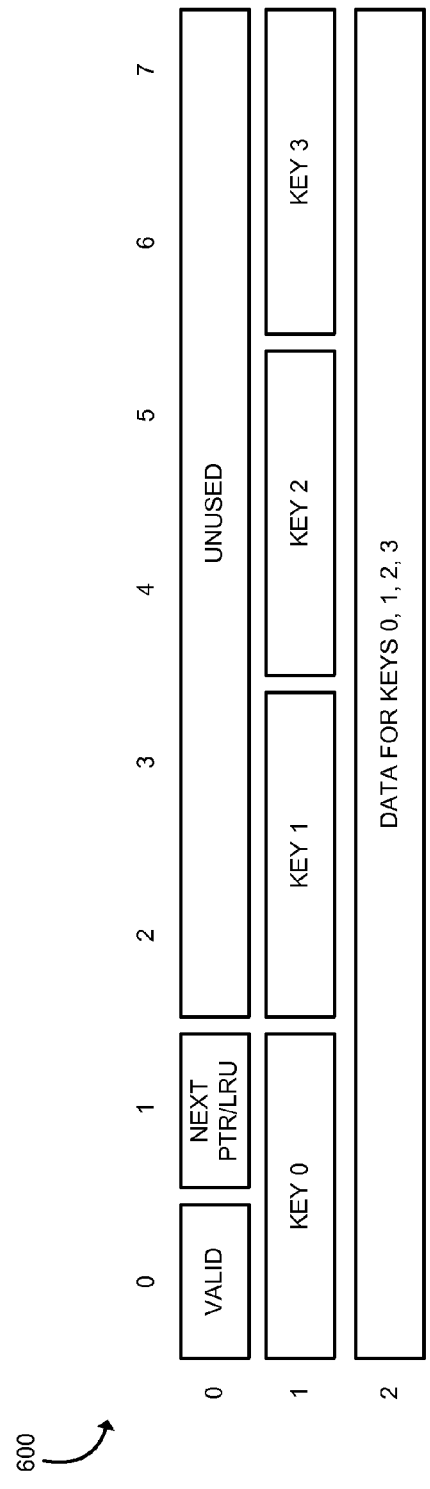

PACKET FLOW CLASSIFICATION

BACKGROUND

In current computing ecosystems, data packets are transmitted between computing devices and/or device components at a rapid pace. Depending on the specific purpose of each received data packet, the receiving computing device processes the data packet in a certain way. Accordingly, the received data packets are categorized or otherwise classified according to "flows" that define operations and/or other rules for the processing of the received packets. As speed is a critical feature in computing systems, a variety of mechanisms have been employed to increase the speed at which such packet flow classifications occur.

Hash tables are often used to improve the speed of data lookup operations when it is necessary to sift through large amounts of data to identify a match. In particular, hash tables (e.g. associative arrays) utilize hash functions to deterministically map data of variable length to data of fixed size (i.e., the signature). Further, the particular hash function may be selected to uniformly distribute the data across intervals of equal size (i.e., hash buckets) based on the value of the signature generated by the hash function. Thereafter, when attempting to identify a match during a data lookup operation, one must only compare the data to the data stored in the interval having the same signature (i.e., not all of the data in the table/list). In that way, hash tables optimize the performance of data lookup operations by minimizing the amount of data that has to be compared against the input data.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIGS. 5 and 6 are simplified diagrams of at least two embodiments of data structures of hash table buckets for packet flow classification by the computing device of FIG. 1;

DETAILED DESCRIPTION OF THE DRAWINGS

Figure 1:
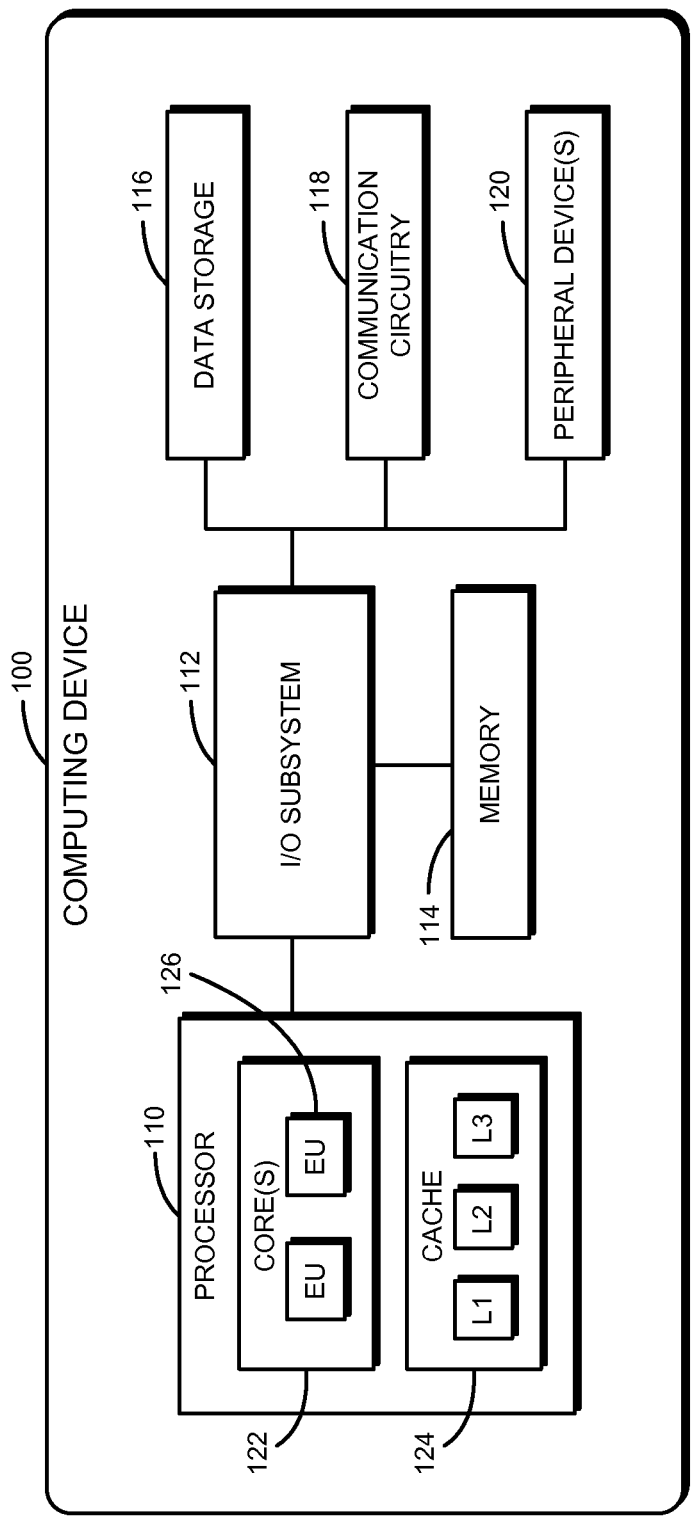
FIG. 1 is a simplified block diagram of at least one embodiment of a computing device for packet flow classification.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a computing device 100 for packet flow classification is shown. As described in detail below, the computing device 100 is configured to read/generate a key based on a set of fields read from a received data packet (e.g., a network packet) and determine a traffic flow by which to handle the data packet based on the read/generated key. In doing so, the computing device 100 utilizes a hash table including a plurality of hash table buckets and handles multiple input packets in parallel as described below. In particular, in the illustrative embodiment, the packet flow classification (e.g., the lookup operation) is broken into several classification stages (see, e.g., FIGS. 4 and 9) at boundaries associated with memory accesses. Further, in the illustrative embodiment, the computing device 100 performs out-of-order execution on the data packets such that operations can be performed on one set (e.g., a pair) of data packets at one stage while data required at another stage for operations on another set of data packets is prefetched (e.g., to lower level cache such as L1 or L2 cache). In such a way, the computing device 100 improves the performance of the lookup operations associated with determining the appropriate traffic flow for a received data packet. It should be appreciated that, in some embodiments, the data structures (e.g., of the hash table and hash table buckets) and processes efficiently utilize processor 110 architecture resources such as cache memory space, cache memory bandwidth, external memory bandwidth, multiple execution units operating in parallel, out-of-order instruction execution, custom processor instructions, and/or other resources.

The computing device 100 may be embodied as any type of computing device capable of performing packet flow classification and/or otherwise performing the functions described herein. For example, the computing device 100 may be embodied as a desktop computer, server, router, switch, laptop computer, tablet computer, notebook, netbook, ultrabook™, cellular phone, smartphone, wearable computing device, personal digital assistant, mobile Internet device, Hybrid device, and/or any other computing/communication device. Further, in some embodiments, the computing device 100 may be embodied as an integrated or standalone component (e.g., a network interface card) configured to perform the functions described herein. As shown in FIG. 1, the illustrative computing device 100 includes a processor 110, an input/output ("I/O") subsystem 112, a memory 114, a data storage 116, a communication circuitry 118, and one or more peripheral devices 120. Of course, the computing device 100 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Further, as shown in FIG. 1, the illustrative processor 110 includes one or more processor cores 122 and one or more cache 124. Depending on the particular embodiment, each of the cores 122 may include one or more execution units 126 configured to execute processor instructions (e.g., fetch, arithmetic, logic, and/or other instructions). Additionally, the processor 110 may include various "levels" of cache 124. For example, in the illustrative embodiment, the cache 124 includes L1 cache, L2 cache, and L3 cache. Depending on the particular architecture implemented, the cores 122 may share some levels of the cache 124 (e.g., L3 cache), whereas the cores 122 may include separate and/or otherwise independent cache for other levels of the cache 124 (e.g., L1 cache). Of course, in other embodiments, one or more levels of the cache 124 (e.g., L3) may be external to the processor 110 (i.e., not on the same processor die).

Further, in some embodiments, the processor 110 may include additional levels of cache 124. As described below, the hash table buckets and other data prefetched during the packet flow classification have data structures designed to have a high probability of being stored into L1 or L2 cache of the processor 110. Of course, it should be appreciated that, in some embodiments, the computing device 102 may include one or more other processors that may not perform or may not be configured to perform the functions described herein with regard to the processors 110.

The memory 114 of the computing device 100 may be embodied as any type of volatile or non-volatile memory or data storage capable of performing the functions described herein. In operation, the memory 114 may store various data and software used during operation of the computing device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and/or other components of the computing device 100, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store hash tables and/or various other data useful during operation of the computing device 100. For example, in some embodiments, during the prefetch operations described below, the hash table 316, hash table buckets 318, and/or other information may be retrieved from the data storage 116 and/or the memory 114 and stored in the cache 124 of the processor 110 for fast execution.

The communication circuitry 118 may be embodied as any communication circuit, device, or collection thereof, capable of enabling communications between the computing device 100 and other remote devices over a network. The communication circuitry 118 may be configured to use any one or more communication technologies (e.g., wireless or wired communications) and associated protocols (e.g., Ethernet, Bluetooth®, Wi-Fi®, WiMAX, etc.) to effect such communication.

The peripheral devices 120 may include any number of additional peripheral or interface devices, such as speakers, microphones, additional storage devices, and so forth. The particular devices included in the peripheral devices 120 may depend on, for example, the type and/or intended use of the computing device 100.

Figure 2:
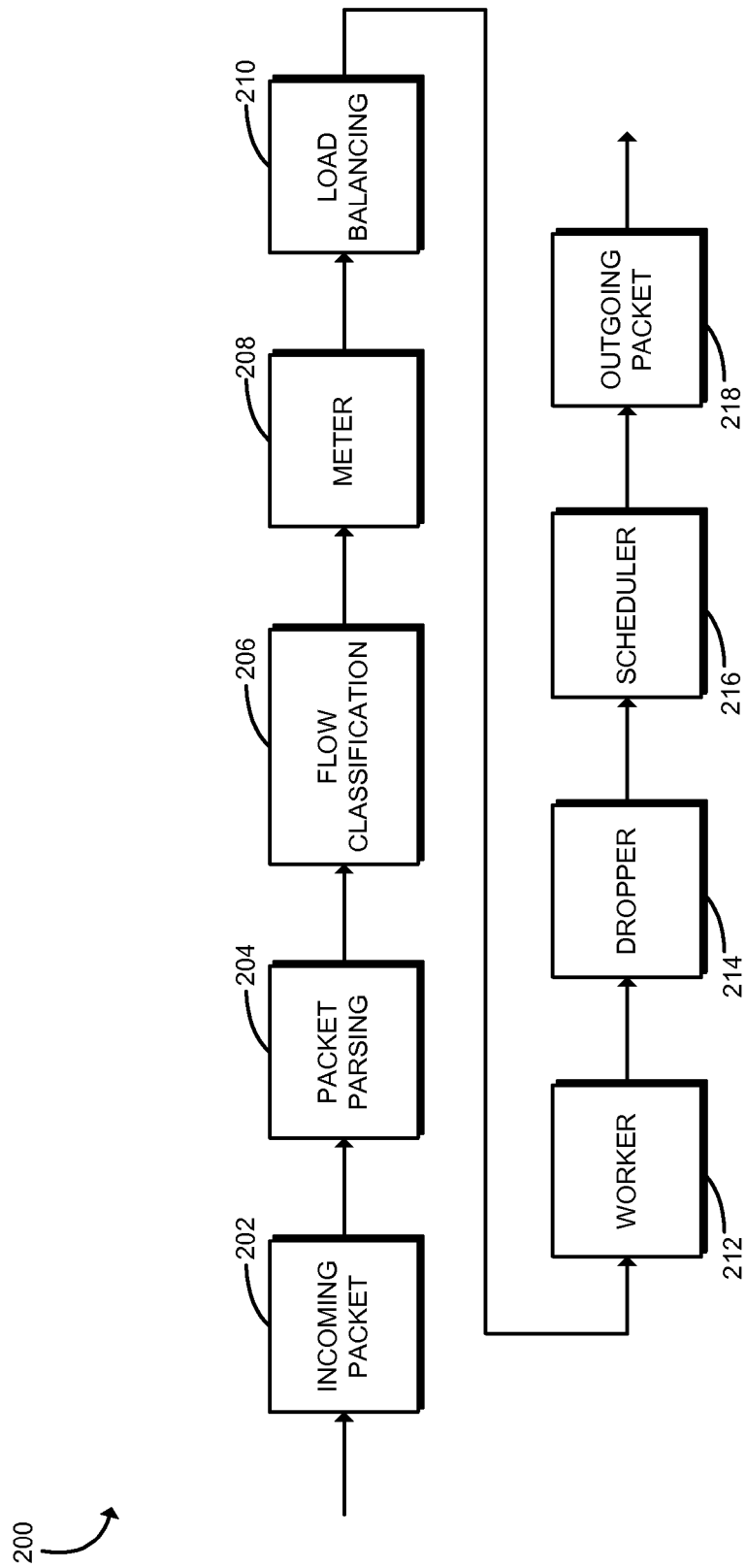
FIG. 2 is a simplified block diagram of at least one embodiment of a packet processing pipeline.

Referring now to FIG. 2, the computing device 100 may perform data packet flow classification by executing a packet processing pipeline 200 (or other packet processing pipeline including flow classification). As shown, the packet processing pipeline 200 illustrates an incoming packet 202, packet parsing 204, flow classification 206, a packet meter 208, loan balancing 210, a packet worker 212, a packet dropper 214, a scheduler 216, and an outgoing packet 218.

The incoming packet 202 may be received from a remote computing device or from a different component of the computing device 100 (e.g., from a network interface card of the computing device 100) depending on the particular embodiment. The packet parsing 204 stage reads the fields of the incoming packet 202 (e.g., from the packet header) and parses the field data for the flow classification 206 stage, which maps the incoming packet 202 to a known traffic flow as discussed herein. The packet meter 208 uses various algorithms (e.g., trTCM or srTCM algorithms) to meter the incoming packet 202, and the load balancing 210 stage distributes the incoming packet 202 to the appropriate application worker 212, for example, for application-specific workload handling. The dropper 214 determines whether to drop the incoming packet 202 based on, for example, the current queue or load level of the scheduler 216 and/or the priority of the incoming packet 202. The scheduler 216 may be a hierarchical multi-level scheduler for managing the scheduling of the processing and/or transmission of the incoming packet 202. The outgoing packet 218 is transmitted to a remote computing device or to a different component of the computing device 100 (e.g., to a network interface card of the computing device 100) depending on the particular embodiment. It should be appreciated that, in the illustrative embodiment, the flow classification 206 occurs subsequent to the packet parsing 204 and prior to the dropper 214, scheduler 216, and other stages that may depend on the particular flow associated with the incoming packet 202 (i.e., depending on the flow classification of the incoming packet 202). Of course, in other embodiments, other processing pipelines, and structures, thereof may be used.

Figure 3:
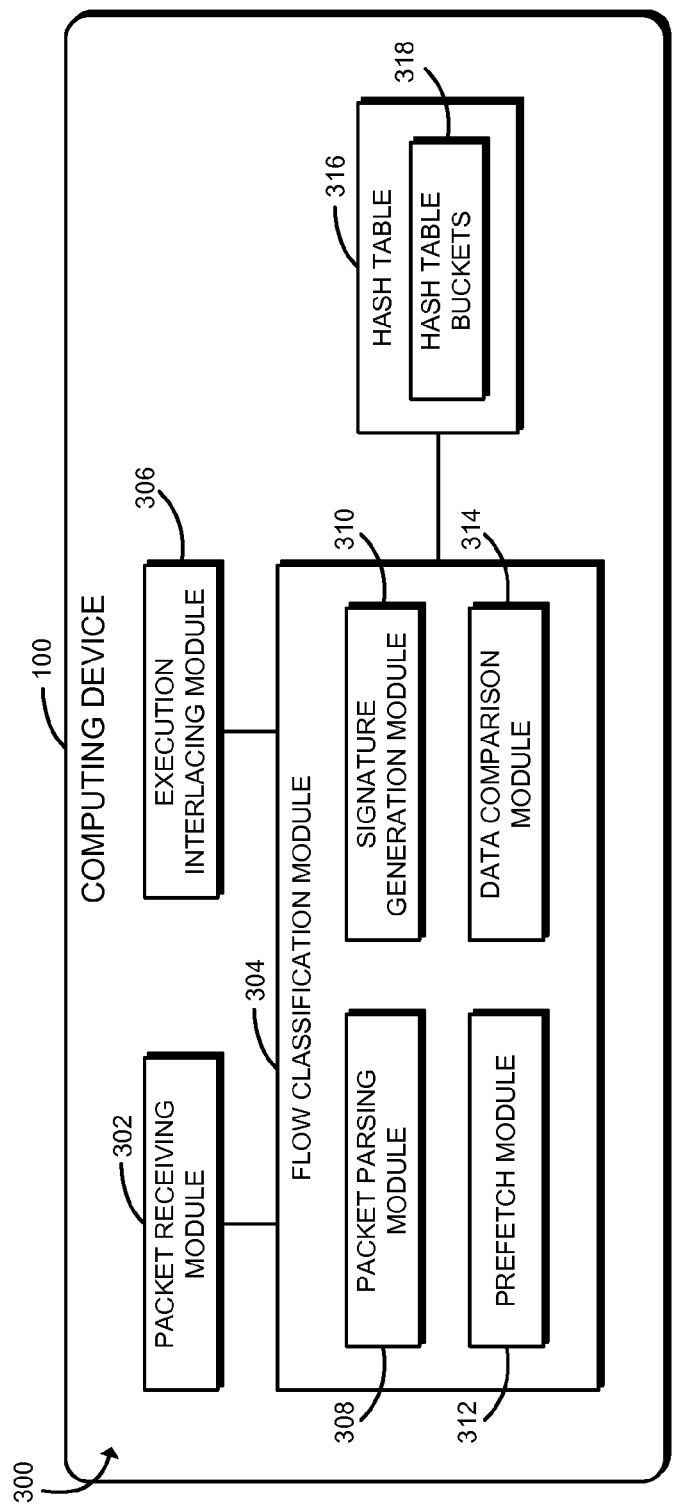
FIG. 3 is a simplified flow diagram of at least one embodiment of an environment for packet flow classification by the computing device of FIG. 1.

Referring now to FIG. 3, in use, the computing device 100 establishes an environment 300 for packet flow classification. As discussed below, in the illustrative embodiment, the computing device 100 receives a burst of data packets (e.g., network packets) and nonlinearly processes the burst of packets in pairs of packets via out-of-order execution. Generally, the computing device 100 determines a key associated with a received data packet based on a set of packet fields of the received data packet (e.g., a specific n-tuple of fields from the packet header), generates/reads a key signature for the determined key, and applies (e.g., compares) the key signature to a hash table 316 to identify a hash table bucket 318 associated with the key signature. The computing device 100 then compares the key to the keys stored in the identified hash table bucket 318 and retrieves a traffic flow for the data packet associated with the matched key in the hash table bucket 318. It should be appreciated that, throughout the packet flow classification operation, there are various memory accesses. As shown, for example, in FIGS. 4 and 9, the packet flow classification is arranged in different stages separated at points at which a memory access occurs. In the illustrative embodiment, the computing device 100 prefetches the data needed for processing of a pair of packets at the next stage while performing other operations (e.g., non-prefetch operations) on the other pairs of packets still in the bucket search pipeline. By prefetching the needed data structures in advance and performing out-of-order execution on the pairs of packets, the computing device 100 hides the latency of memory read accesses (i.e., provided that it is performed early enough before the respective data structure is to be used) and loosens the data dependency between instructions.

The illustrative environment 300 of the computing device 100 includes a packet receiving module 302, a flow classification module 304, and an execution interlacing module 306. Additionally, the flow classification module 304 includes a packet parsing module 308, a signature generation module 310, a prefetch module 312, and a data comparison module 314. Each of the packet receiving module 302, the flow classification module 304, the execution interlacing module 306, the packet parsing module 308, the signature generation module 310, the prefetch module 312, and the data comparison module 314 may be embodied as hardware, software, firmware, or a combination thereof. Additionally, in some embodiments, one or more of the illustrative modules may form a portion of another module (e.g., the execution interlacing module 306 may form a portion of the flow classification module 304) and/or one or more of the illustrative modules may be embodied as a standalone or independent module (e.g., the packet parsing module 308 may be separate from the flow classification module 304).

The packet receiving module 302 handles incoming data packets bound for packet flow classification. As indicated above, in some embodiments, the incoming data packets may be, for example, network packets received from a remote computing device, whereas in other embodiments, the data packets may be received from another component of the computing device 100. Accordingly, in some embodiments, the packet receiving module 302 is configured to handle the communication between the computing device 100 and remote devices (e.g., via a network). Further, in some embodiments, the packet receiving module 302 determines whether to pass an incoming/received data packet to the flow classification module 304 for packet flow classification. As indicated above, the packet receiving module 302 may receive and may, therefore, forward data packets in packet bursts (i.e., groups of packets).

The flow classification module 304 maps each incoming data packet against one of the known traffic flows (e.g., network traffic flows) stored in the hash table 316. It should be appreciated that the hash table 316 may include upwards of millions of traffic flows from which the appropriate flow for a particular data packet is identified. As such, the flow classification module 304 determines which operations to perform (e.g., from the millions of different sets/flows of operations) on the data packet. It should be appreciated that, in some embodiments, the flow classification module 304 handles each burst of packets together.

As shown in FIG. 3, the hash table 316 includes a plurality of hash table buckets 318. Although only one hash table 316 is shown in the illustrative embodiment, multiple hash tables may be used in other embodiments. It should be appreciated that the use of the hash table 316 as described herein for the lookup operations associated with the flow classification increases the speed at which data packets may be classified compared to traditional protocols. The illustrative hash table 316 may be embodied as an associative array or similar data structure that can be specified as, for example, a set of key-value pairs in which the key is associated with the packet fields from the data packet header and the value is the appropriate traffic flow for a data packet having that particular combination of packet fields. In some embodiments, the key may be embodied as an n-tuple of packet fields that uniquely identify a traffic flow (e.g., a connection). For example, a differentiated services or "DiffServ" 5-tuple, (Source IP address, Destination IP address, L4 protocol, L4 protocol source port, L4 protocol destination port), which may be identified from the packet header may be utilized as a packet key. Further, depending on the particular process/traffic flow, the size of the data associated with that flow may vary (e.g., from as little as a few bytes to several kilobytes).

In the illustrative embodiment, a non-cryptographic hash function (e.g., jhash, CRC hash, or another suitable hash function) is used to deterministically map the particular packet keys (e.g., generated or read from an n-tuple of fields selected from the packet header parameters) to a fixed-size hash value or "key signature." In other words, the hash function maps variable length data to fixed length data to compress a long key into a short signature. Further, in the illustrative embodiment, the hash function is selected to have an approximately uniform distribution such that several keys share the same key signatures (e.g., four keys per signature). In such a way, the hash table 316 may sort the vast number of keys into different hash table buckets 318 or lists of keys. That is, rather than storing the key-value pairs in a single list, the hash table 316 maintains hash table buckets 318. For any given key, there is a single hash table bucket 318 in which the particular key may exist, which is identified based on the key signature of the key. As such, either the hash table bucket 318 associated with a key signature of a particular key will include the particular key or the hash table 316 will not include the key at all, so the lookup operation can be narrowed to the identified hash table bucket 318. It should be appreciated that the even distribution of keys among the hash table buckets 318 may improve the performance of the hash table lookup operation. In some embodiments, keys may be mapped to a particular hash table bucket 318 by using the key signature (modulo the number of hash table buckets 318) as the identifier of the hash table bucket 318. In other words, the bucket identifier may be assigned according to bucket_id=f_hash (key) % n_buckets. Similarly, in order to instead utilize a bitwise logical operation, the bucket identifier may be assigned according to bucket_id=f_fash (key) & (n_buckets−1), in the case when n_buckets is selected to be a number that is a power of two. In some embodiments, this results in keys that have the same least significant n_bits being assigned to the same hash table bucket 318. Depending on the particular hash function and the particular implementation, the key signature may be embodied as, for example, a modulus of the key, a modulus of a hash of the key, or the hash of the key itself. For example, a hash function or other signature-generated function employed may include the features described herein to distribute the keys among the hash table buckets 318. Further, in the illustrative embodiment, each of the hash table buckets 318 is configured to store four keys and corresponding data (i.e., data associated with the corresponding traffic flow); however, in other embodiments, each hash table bucket 318 may store a different number of key-value pairs (e.g., eight).

Depending on the particular embodiment, the hash table 316 may be embodied as a fixed key size hash table (see, e.g., FIGS. 5 and 6) or a configurable key size hash table (see, e.g., FIG. 10) as described in greater detail below. Further, as indicated above, the hash table 316 of the illustrative embodiment includes hash table buckets 318 having allocated space for exactly four keys. However, in some circumstances, it is possible that a given hash table bucket 318 already has four keys when a new key is to be added to the bucket 318. Accordingly, depending on the particular embodiment, the hash table 316 may include extendible buckets 318 or a least recently used (LRU) feature.

For example, in embodiments in which the hash table 316 includes extendible hash table buckets 318, the hash table bucket 318 may be "extended" to allocate additional space for four more keys. In some embodiments, this is done by allocating additional memory upon initialization of the hash table 316, which is used to create a pool of free keys. Accordingly, a group of four keys may be added to the hash table bucket 318, some of which may not yet be valid keys. Similarly, a group of four keys may be deleted from the hash table bucket 318 and returned to the pool of free keys. During lookup operations, if a match is not found within the first group of four keys of the table bucket 318 that has been extended, the search continues in the extended/added group of keys. If no match has been found and the bucket 318 has been further extended, the search continues, and so on, until a match is found or all keys in the extended bucket 318 have been compared to the input key.

In embodiments in which the hash table 316 includes an LRU feature, one of the existing keys in the hash table bucket 318 is deleted so that a new key can be added in that allocated space and the number of keys in the hash table bucket 318 does not exceed four. In order to determine which of the four keys to delete from the hash table bucket 318, the order in which the keys are accessed is maintained and the least recently used is deleted. For example, in some embodiments, each time a key is accessed (e.g., read, added, etc.), it becomes the most recently used (MRU) key and moves to the "back of the line" insofar as a deletion order is concerned. In the illustrative embodiment, the LRU and extendible bucket features utilize particular data structures for the hash table 316 and/or the hash table buckets 318 as described below.

As indicated above and shown in FIG. 3, the flow classification module 304 includes the packet parsing module 308, the signature generation module 310, the prefetch module 312, and the data comparison module 314. The packet parsing module 308 reads a data packet (e.g., networking packet) forwarded from the packet receiving module 302 and determines the key associated with the data packet. As discussed above, the key may be determined based on a specific n-tuple of packet fields selected from the packet header.

Figure 10:
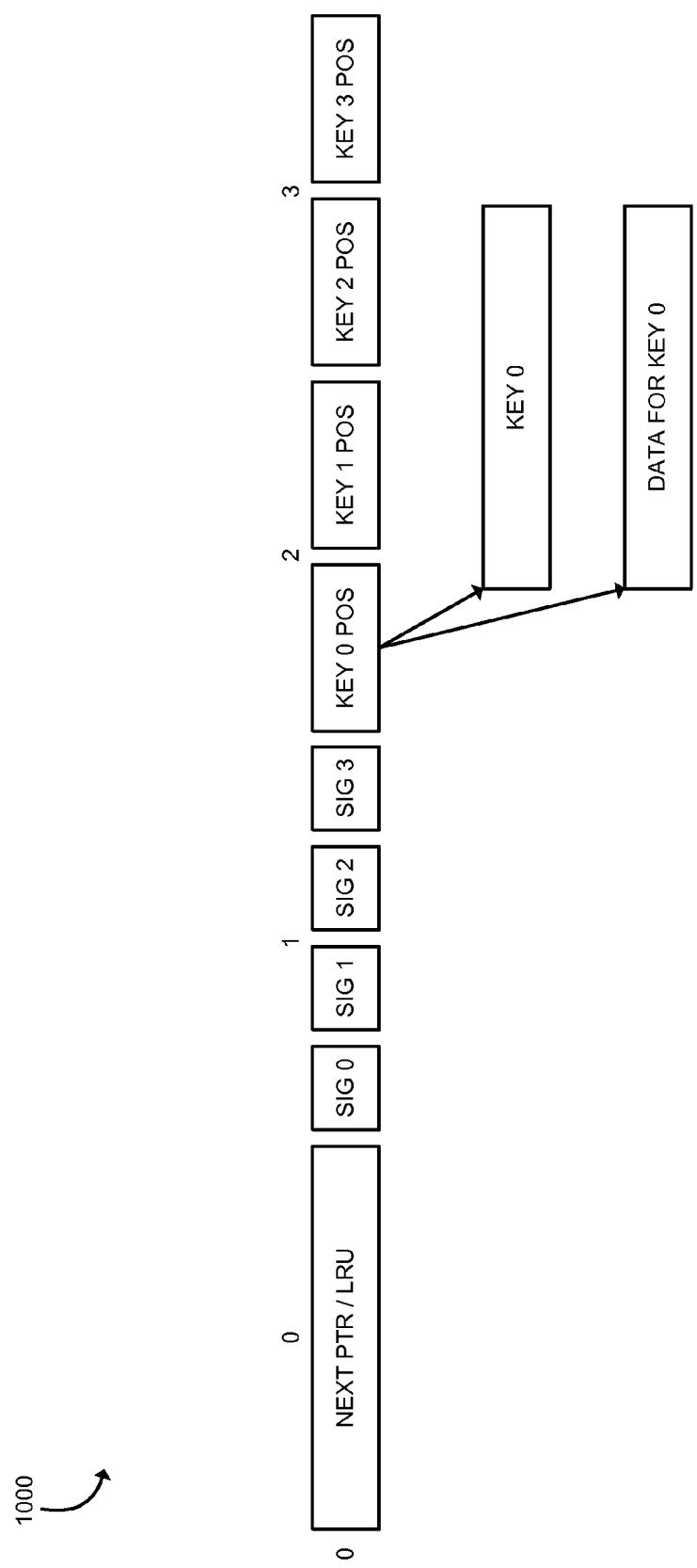
FIG. 10 is a simplified diagram of at least one embodiment of a data structure of a hash table bucket for packet flow classification by the computing device of FIG. 1.

The signature generation module 310 is configured to generate signatures of the keys associated with the data packets. To do so, in the illustrative embodiment, the signature generation module 310 applies a hash function to a particular key to generate a key signature of the key as described above. It should be appreciated that the hash function is the same hash function used to generate the hash table 316 and to split the keys among the various hash table buckets 318. Further, in some embodiments, the signature generation module 310 may utilize additional or alternative signature mechanisms to those described above (e.g., other hash-, logical-, bitwise-, modulus-, and/or arithmetic-based signatures). For example, in embodiments having a configurable key size hash table 316, another key signature may be used in addition to the key signature identifying the particular hash table bucket 318 as shown in FIG. 10.

Depending on the particular embodiment, the signature generation module 310 may pre-compute the key signature or compute the key signature on lookup. In embodiments in which the key signature is pre-computed, the key lookup operation may be shared between two cores 122 of the processor 110. The first core 122 (e.g., the core 122 that handles receipt of the packet) may extract the key from the packet, compute the key signature of the key, and save both the key and the key signature in a packet buffer as packet metadata. The second core 122 may read both the key and the key signature from the packet metadata and identify the corresponding hash table bucket 318 based on the key signature. In embodiments in which the key signature is not pre-computed (i.e., it is computed "on the fly"), the same core 122 may read the key from the packet metadata, compute the key signature of the key, and identify the corresponding hash table bucket 318 based on the key signature.

Figure 4:
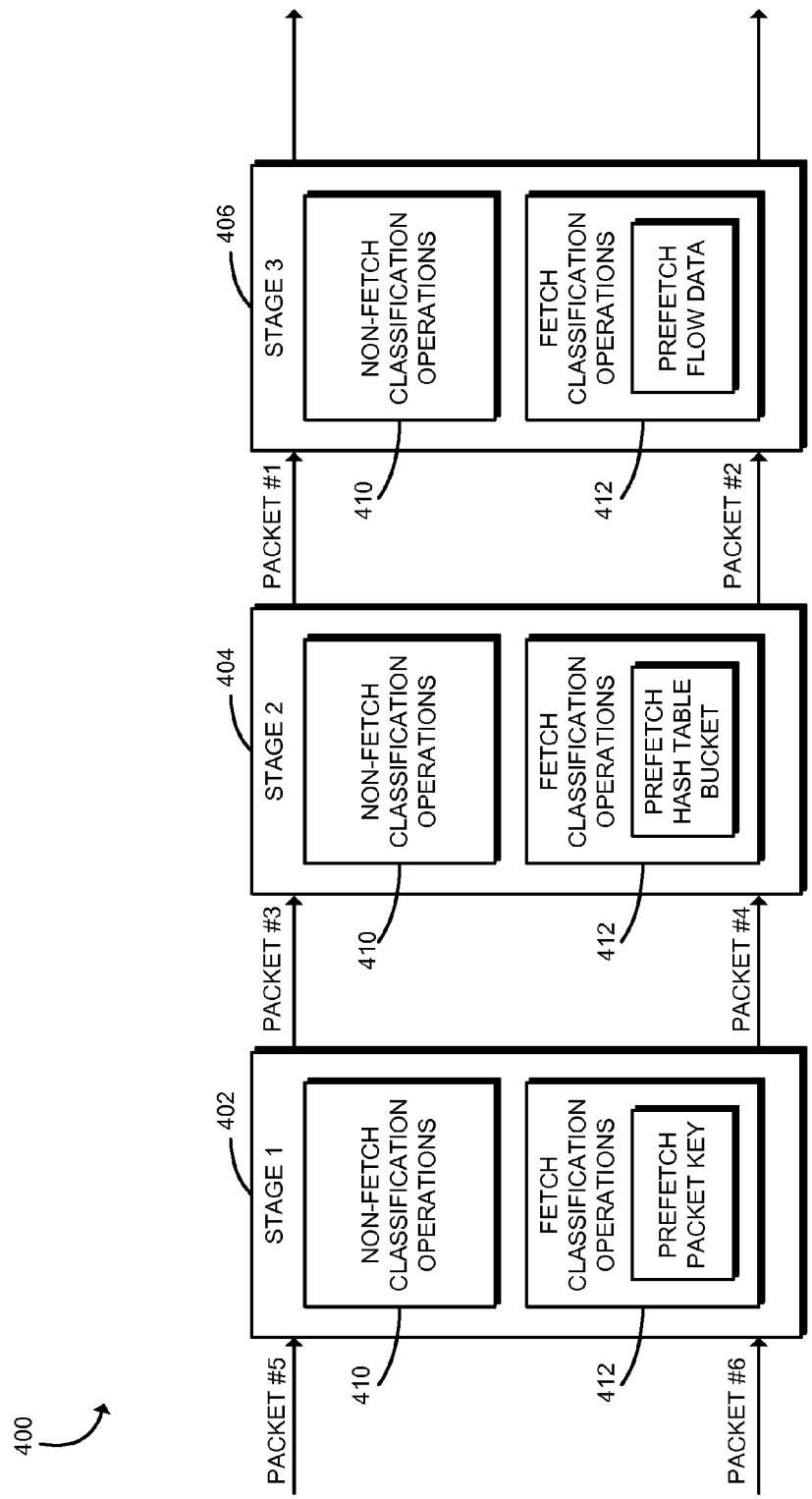
FIG. 4 is a simplified diagram of at least one embodiment of a bucket search pipeline that may be executed by the computing device of FIG. 1.
Figure 9:
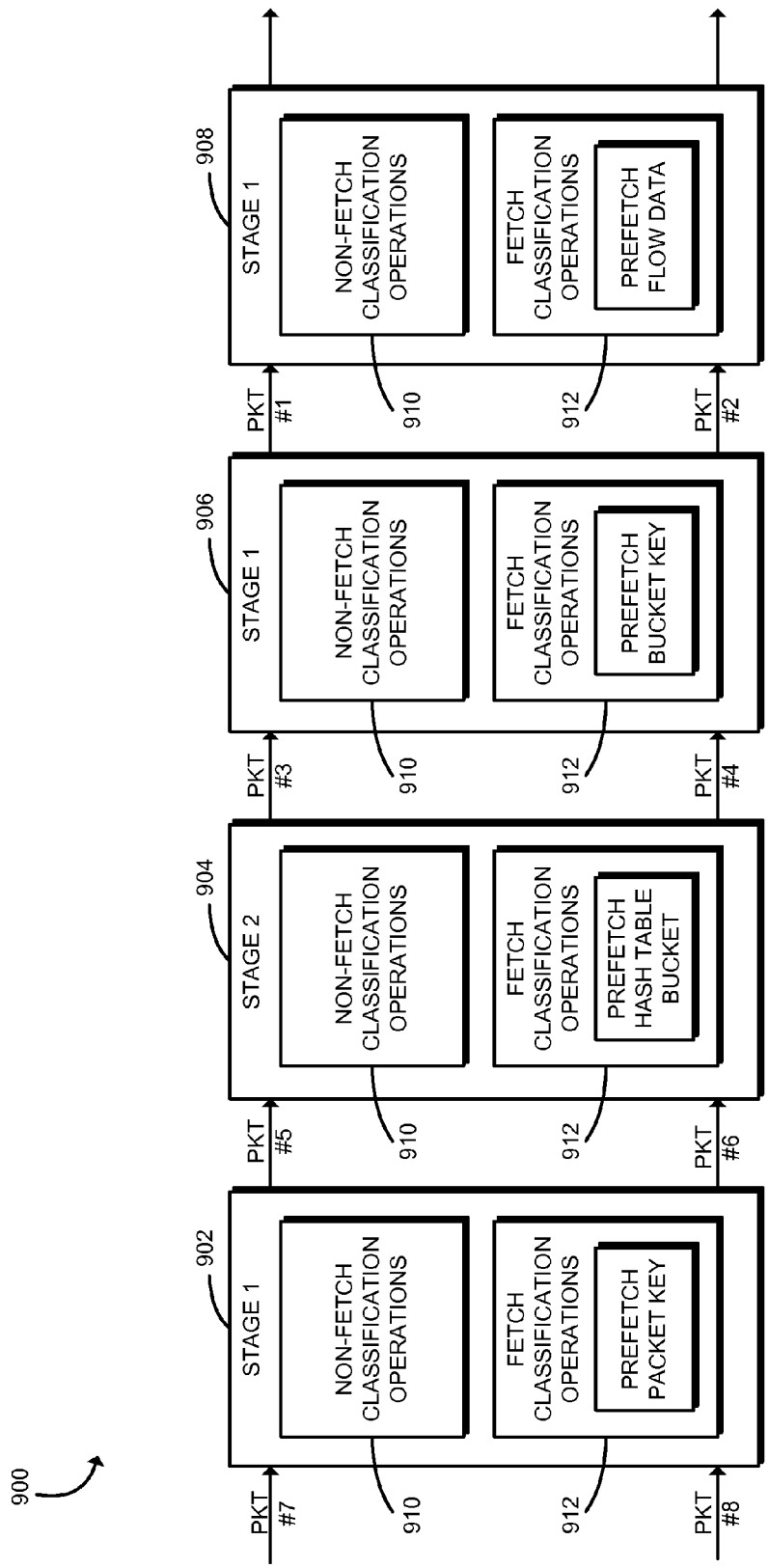
FIG. 9 is a simplified diagram of at least one other embodiment of a bucket search pipeline that may be executed by the computing device of FIG. 1.

The prefetch module 312 is configured to prefetch data needed for the next stage of operation in the bucket search pipeline for a particular data packet as shown in FIGS. 4 and 9. For example, in some embodiments, the prefetch module 312 retrieves the data from higher-level cache 124 (e.g., L3 cache) or external memory such as dynamic random-access memory (DRAM) and stores the retrieved data in L1 and/or L2 cache 124 of the processor 110. As indicated above, in the illustrative embodiment, the prefetch module 312 prefetches the appropriate data while the computing device 100 performs other operations. In some embodiments, the prefetch module 312 performs prefetch operations with a first execution unit 126 of the processor 110 and performs other operations (e.g., non-fetch operations) with another execution unit 126 of the processor 110 at the same time. For example, a first execution unit 126 may prefetch a key for a first packet while another execution unit 126 identifies a hash table bucket 318 corresponding with a key signature of another packet.

As shown in FIGS. 4 and 9, the prefetches (i.e., memory accesses) occur at the breaks between the stages of the corresponding bucket search pipeline. By prefetching the required data in advance, the number of L2 or L3 cache memory misses is greatly reduced. It should be appreciated that the cost of L2 and L3 cache memory misses on memory read accesses is high (e.g., resulting in significant latency), often results from data dependency between instructions, and force the execution units 126 of the processor 110 to stall until the read operation is completed from L3 cache memory or external DRAM. However, by prefetching the data for a next classification stage, when the processor 110 eventually executes that stage for the corresponding packet, the processor 110 may read the data structures from L1 or L2 cache 124 and avoid the significant penalty incurred by an L2 or L3 cache 124 memory miss. Further, by increasing the gap between two consecutive accesses to the same data structure, the data dependency between instructions is loosened thereby allowing for more effective use of, for example, a super-scalar and out-of-order execution processor architecture. In particular, the number of execution units 126 of the processor 110 that are active (i.e., rather than idle or stalled due to data dependency constraints between instructions) is maximized or improved.

The data comparison module 314 is configured to compare various data as described herein to determine, for example, whether there is a match between the data being compared. For example, the data comparison module 314 compares the key signature associated with a particular data packet to the hash table 316 to identify the hash table bucket 318 corresponding with the data packet. Further, the data comparison module 314 compares the key of a particular packet with the keys stored in a hash table bucket 318 corresponding with the packet's key signature to identify a traffic flow associated with the packet key and, therefore, associated with the data packet. Additionally, in some embodiments, the data comparison module 314 may compare bucket signatures stored in a hash table bucket 318 with corresponding data to determine a position of a matching key as described below with regard to FIGS. 9-12.

The execution interlacing module 306 manages or otherwise handles the out-of-order execution of data packets from a data packet burst. As described herein, multiple data packets from the packet burst are handled in parallel and the stages of the bucket search pipeline are arranged such that the execution of the packets from the packet burst is interlaced as shown and described with regard to FIGS. 4 and 9. The execution interlacing module 306 ensures that non-fetch packet flow classification operations are executed on data packets of the packet burst while prefetch operations are performed on other packets of the burst. Further, in the illustrative embodiment, the out-of-order execution of the packet burst is performed without executing a branch instruction. It should be appreciated that, in some embodiments, the execution interlacing module 306 may form a portion of the flow classification module 304.

Referring now to FIG. 4, at least one embodiment of a bucket search pipeline 400 illustrating three classification stages of a packet flow classification lookup operation is shown. The bucket search pipeline 400 is configured for use with a single key size hash table 316 and one of the bucket data structures 500, 600 of FIGS. 5 and 6. The illustrative pipeline 400 includes a first classification stage 402, a second classification stage 404, and a third classification stage 406. As shown in FIG. 4 and discussed above, the computing device 100 is configured to handle multiple input packets in parallel. For example, in the illustrative pipeline 400, the packets #1 and #2 are shown as presently being processed in parallel at the third stage 406, the packets #3 and #4 are shown as presently being processed in parallel at the second stage 404, and the packets #5 and #6 are shown as presently being processed in parallel at the first stage 402.

In other words, in the illustrative embodiment, each stage 402, 404, 406 handles two packets in parallel at a time. On each pipeline 400 iteration, the packets are pushed to the next classification stage. For example, on the iteration following the one shown in FIG. 4, the packets #1 and #2 will exit the pipeline 400 having retrieved the traffic flows corresponding with those packets. The packets #3 and #4 will proceed to the third stage 406, the packets #5 and #6 will proceed to the second stage 404, and new packets #7 and #8 (not shown) will enter the first stage 402. The pipeline 400 iterations will continue until all packets from the burst of packets execute the third stage 406 of the pipeline 406 (i.e., until traffic flows are retrieved for all of the packets).

As described above, the classification stages 402, 404, 406 are processed via out-of-order execution such that packet processing is interlaced. In one embodiment, the first stage 402 is performed on packets #5 and #6 and before the second stage 404 is performed on those packets, a different stage 404, 406 is performed on other packets. For example, before the second stage 404 is performed on packets #5 and #6 (e.g., while the packet key is being prefetched), the second stage 404 may be performed on packets #3 and #4, and the third stage 406 may be performed on packets #1 and #2. As shown, in the illustrative embodiment, non-fetch classification operations 410 and fetch classification operations 412 are performed at each of the classification stages. The particular operations 410, 412 performed at each stage may vary depending on the particular stage, the algorithms utilized, and/or other flow classification features. As such, the order and/or extent of processing of different packets during prefetch operations may vary depending on the particular embodiment and/or circumstances.

As shown in FIG. 4, the bucket search pipeline 400 begins with the first stage 402 in which the computing device 100 selects the next two data packets from the burst of received input packets. It should be appreciated that the computing device 100 performs the pipeline operations described below on each of the data packets in the pair; however, for clarity and ease of description, the pipeline operations may be described as being performed on a single data packet. At the first stage 402, the computing device 100 also prefetches packet metadata containing the key and/or the key signature of the data packet. As described above, in some embodiments, the key signature may be pre-computed and stored in the packet buffer as packet metadata, whereas in other embodiments, only the key is read from the packet metadata and the key signature is generated based on the key and the appropriate signature/hash algorithm. Further, the key is determined according to packet fields of the data packet (e.g., an n-tuple of fields in the packet header).

At the second stage 404, the computing device 100 either reads the key signature from the packet metadata or reads the key and generates the key signature based on the key, depending on the particular embodiment. As discussed above, in order to generate the key signature, the computing device 100 applies the appropriate signature or hash function to the key (e.g., the same function used to place the keys in the appropriate hash table buckets 318). Further, the computing device 100 identifies the hash table bucket 318 corresponding with the key signature. As discussed above, in doing so, the computing device 100 may compare the key signature to the hash table 316 to determine a bucket identifier that matches the key signature. The computing device 100 prefetches the identified hash table bucket 318.

At the third stage 406, the computing device 100 reads the identified hash table bucket 318 and compares the keys stored in that hash table bucket 318 with the key associated with the data packet being processed to identify a match. If there is a match, the computing device 100 prefetches or retrieves the traffic flow associated with the matched key so that the packet may be processed according to the retrieved traffic flow. In embodiments in which the hash table 316 includes a LRU feature, branchless logic is utilized to update the LRU list in the hash table bucket 318 to identify the matched key as the MRU. Further, in embodiments in which there is entirely branchless logic, a traffic flow may be retrieved even if there is no match and error handling may occur. Additionally, in embodiments in which an extendible bucket hash table 316 is used, once the pipeline 400 executes for all of the packets in the packet burst, an alternative bucket search algorithm (e.g., a non-optimized algorithm) may be employed for any data packets that did not produce a lookup hit (i.e., packets for which a traffic flow was not identified) but searched a bucket 318 in an extended state. It should be appreciated, however, that the concepts described with regard to the bucket search pipeline 400 may also apply to a configurable key size hash table 316.

Referring now to FIG. 5, a data structure 500 for a hash table bucket 318 storing 8-byte keys is shown. In the illustrative embodiment, the data structure 500 includes an 8-byte "valid" field that is used to identify whether the keys (i.e., "key 0," "key 1," "key 2," and "key 3") of the particular bucket 318 are valid. In some embodiments, the corresponding bit 0-3 of the valid field is set to "1" if the corresponding key 0-3 is valid or to "0" otherwise. For example, if key 0 is valid, then bit 0 of the valid field should be set to "1." The remaining bits 4-7 of the valid field may be used for extendible bucket tables to help with the implementation of branchless logic. For example, bit 4 of the valid field may be set to "1" if the next pointer in an extendible bucket 318 is valid and to "0" otherwise.

The illustrative data structure 500 also includes an 8-byte "next pointer or LRU" field to handle the operations associated with LRU features or extendible bucket features of a particular bucket 318. In other words, this field instructs the computing device 100 how to manage the bucket 318 in the event that the bucket 318 is full (i.e., has four keys) and another key is to be added to the bucket as described above. In embodiments in which LRU features are implemented, this field represents the LRU list for the current bucket 318 stored as an array of four entries of two-bytes each in order of use. In the illustrative embodiment, entry 0 stores the index of the MRU key in the data structure 500 and entry 3 stores the index of the LRU key in the data structure 500. As such, each of the entries stores an index of one of the keys 0, 1, 2, 3 stored in the data structure 500 based on the use of that key relative to the other keys. In embodiments in which extendible buckets 318 are utilized, the "next pointer or LRU" field represents the pointer to the next group of four keys linked to the bucket 318. If the pointer is not "NULL," then the bucket is currently in extended state. As shown in FIG. 5, the data structure 500 also stores the four 8-byte keys of the bucket 318 (i.e., keys 0, 1, 2, 3) and the data corresponding with each of the keys (i.e., the associated traffic flow). It should be appreciated that the memory size of the data may vary depending on the particular embodiment. Accordingly, the full size of the hash table bucket 318 data structure 500 in the illustrative embodiment is 64 bytes plus four times the size of each data entry (i.e., the traffic flow data).

Referring now to FIG. 6, a data structure 600 for a hash table bucket 318 storing 16-byte keys is shown. It should be appreciated that the data structure 600 is similar to the data structure 500 except that the data structure 600 has 16-byte keys and a full size of 128 bytes plus four times the size of each data entry. As indicated above, the bucket search pipeline 400 may utilize either of the data structures 500, 600 depending on the particular embodiment. Additionally, it should be appreciated that various features of the data structures 500, 600 may vary (e.g., the specific bit organization of the "valid" and "next pointer or LRU" fields) in other embodiments.

Figure 7:
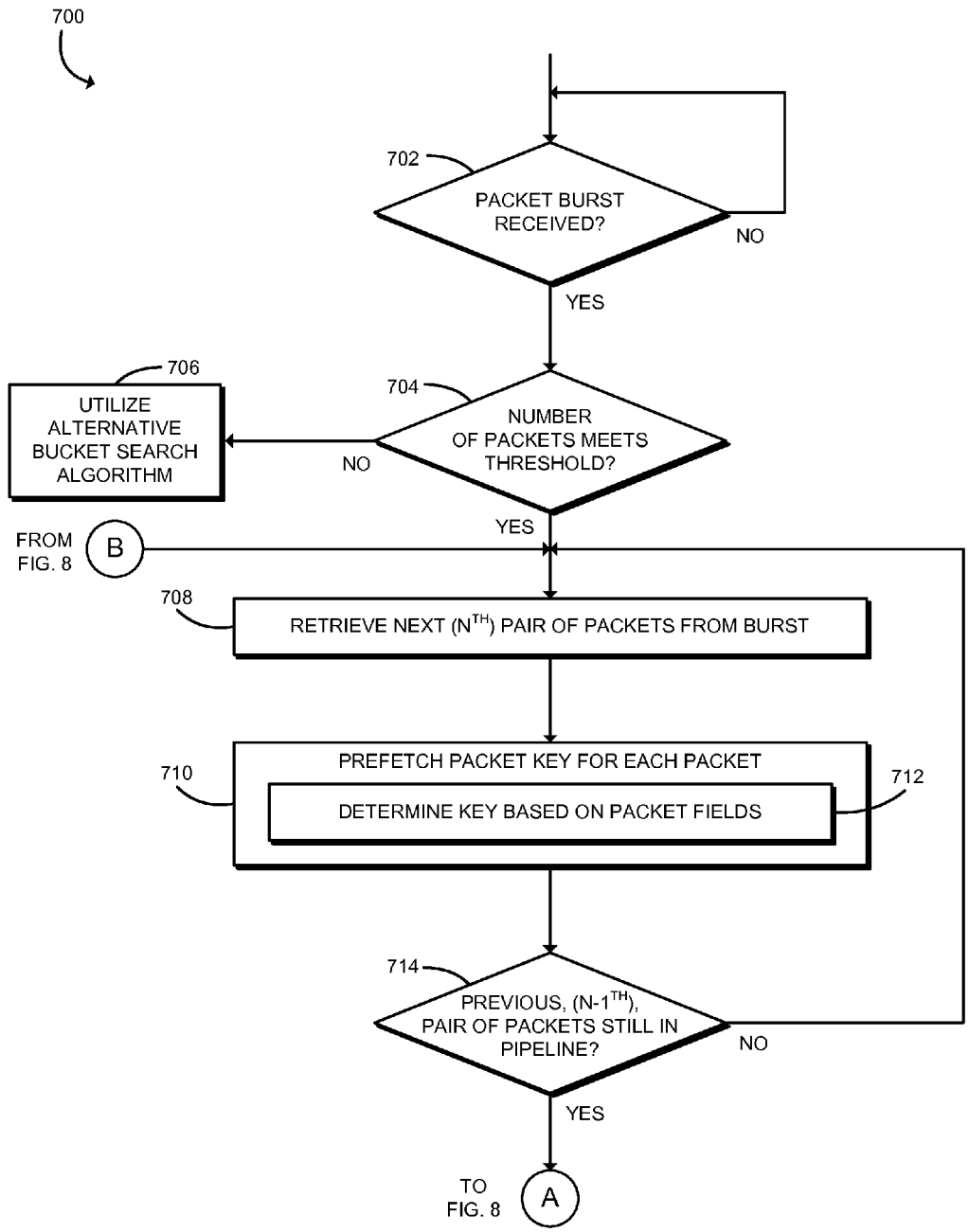
FIGS. 7 and 8 is a simplified flow diagram of at least one embodiment of a method for packet flow classification that may be executed by the computing device of FIG. 1.
Figure 8:
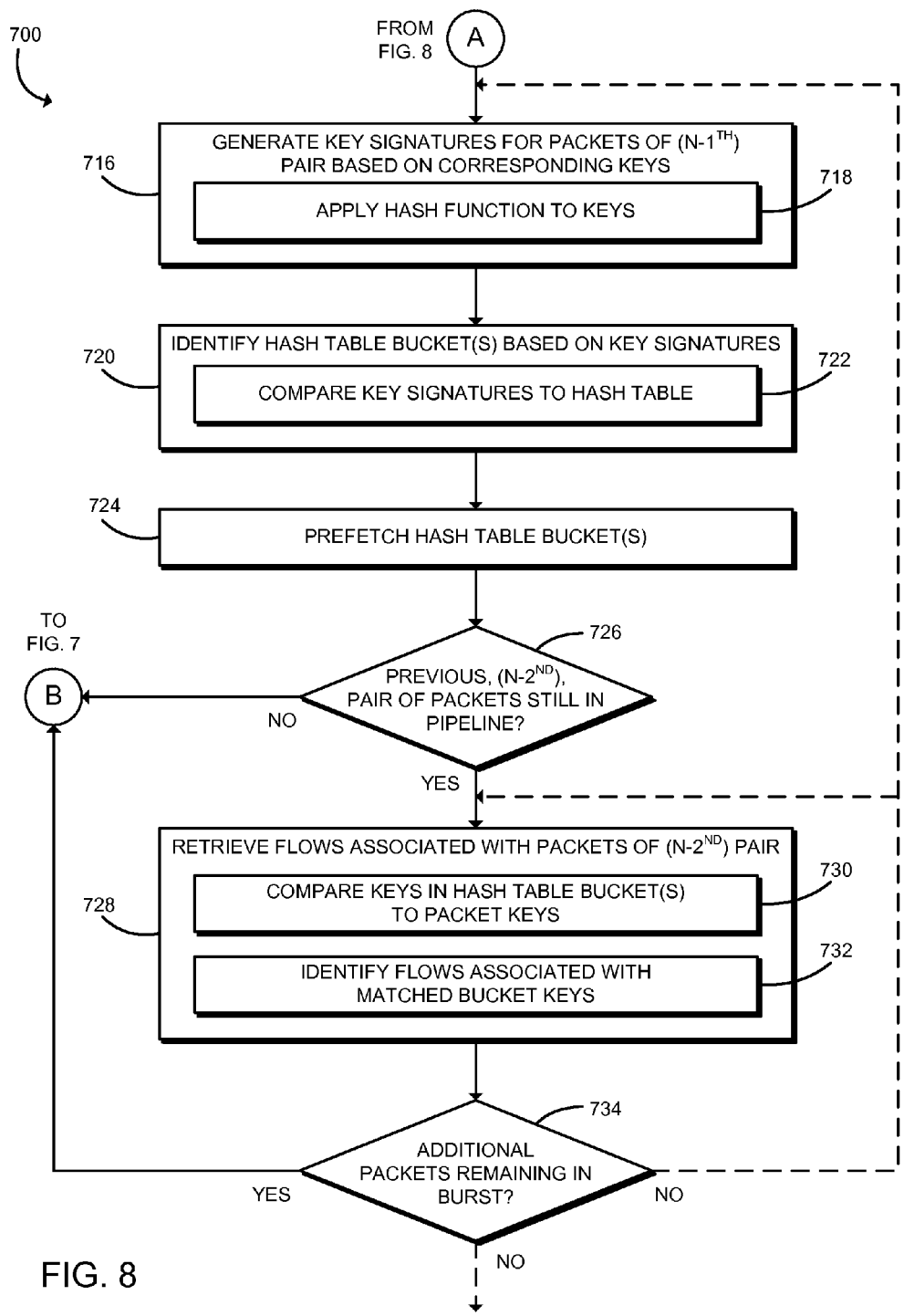

Referring now to FIGS. 7-8, in use, the computing device 100 may execute a method 700 for packet flow classification. It should be appreciated that, in some embodiments, the illustrative method 700 corresponds with the bucket search pipeline 400 and begins with block 702 in which the computing device 100 determines whether a packet burst has been received. If so, the computing device 100 determines whether the number of packets in the packet burst meets a threshold in block 704. In the illustrative embodiment, the bucket search pipeline 400 is executed only if there are at least five packets in the burst of input packets. As such, in the illustrative embodiment, the threshold number of packets in a packet burst is five. Of course, the threshold may differ in other embodiments. If the number of packets in the packet burst does not meet the threshold (i.e., there are fewer than five packets in the burst), the computing device 100 utilizes an alternative bucket search algorithm (e.g., a non-optimized or traditional search algorithm) to determine the traffic flow associated with each of the packets in the packet burst in block 706.

If the number of packets meets the threshold (i.e., there are at least five packets in the burst), the computing device 100 retrieves the next ($N^{TH}$) pair air of packets from the packet burst in block 708. As discussed above, the packets of the packet burst are processed through the bucket search pipeline 400 in pairs. In block 710, the computing device 100 prefetches the packet key for each packet in the pair (e.g., from packet metadata stored in a packet buffer). As discussed above, in some embodiments, the computing device 100 may generate a key for a particular packet based on the packet fields of that packet in block 712. In block 714, the computing device 100 determines whether a previous (N-1$^{TH}$) pair of packets (i.e., a pair of packets that previously entered the pipeline 400) is still in the pipeline 400. In other words, the computing device 100 determines whether there is a pair of packets waiting for execution at the second stage 404 of the pipeline 400. If not, the computing device 100 returns to block 708 in which the computing device 100 retrieves the next (N+1$^{TH}$) pair of packets from the packet burst.

If the previous pair of packets is still in the pipeline (i.e., at the second stage 404), the method 700 advances to block 716 of FIG. 8 in which the computing device 100 generates key signatures for the packets of the (N-1$^{TH}$) pair based on the corresponding keys. In doing so, the computing device 100 may apply a suitable hash or signature function to the keys in block 718. As described above, in some embodiments, the key signature may be pre-computed in which the key signature may be read. In block 720, the computing device 100 identifies the hash table buckets 318 that store the corresponding keys based on the key signatures of the packets. In doing so, the computing device 100 compares the key signatures to the hash table 316 in block 722. In block 724, the computing device 100 prefetches the hash table buckets 318 in block 724 as described above.

In block 726, the computing device 100 determines whether a previous (N-2$^{ND}$) pair of packets is still in the pipeline 400. In other words, the computing device 100 determines whether there is a pair of packets waiting for execution at the third stage 406 of the pipeline 400. If not, the computing device 100 returns to block 708 of FIG. 7 in which the computing device retrieves the next (N+1$^{TH}$) pair of packets from the packet burst. However, if the previous pair of packets is still in the pipeline (i.e., at the third stage 406), the computing device 100 prefetches or otherwise retrieves the traffic flows associated with the packets of the (N-2$^{ND}$) pair in block 728. As discussed above, in doing so, the computing device 100 compares the keys stored in the hash table buckets 318 (i.e., the bucket keys) to the keys of the input packets in block 730 and identifies the traffic flows associated with the matched bucket keys in block 732.

In block 734, the computing device 100 determines whether there are any additional packets remaining in the packet burst. If so, the method 700 returns to block 708 of FIG. 7 in which the computing device 100 retrieves the next pair of packets. It should be appreciated that, in some circumstances, there may be only one remaining packet in which the computing device 100 retrieves that packet and may, for example, process that packet individually rather than as a pair. If there are no additional packets remaining, the method 700 returns to block 716 or 728 or terminates depending on whether there are any other packets remaining in the pipeline 400 from that packet burst. For example, if packets remain at the second stage 404 for processing, the method 700 returns to block 716 in which the computing device 100 generates the key signatures for those packets. If not but packets remain at the third stage 406 for processing, the method 700 returns to block 728 in which the computing device 100 retrieves the flows for those packets. Otherwise, the method 700 terminates.

Referring now to FIG. 9, at least one embodiment of a bucket search pipeline 900 illustrating four classification stages of a packet flow classification lookup operation is shown. The bucket search pipeline 900 is configured for use with a configurable size key hash table 316 and the bucket data structure 1000 of FIG. 10. The illustrative pipeline 900 includes a first classification stage 902, a second classification stage 904, a third classification stage 906, and a classification fourth stage 908. It should be appreciated that various operations and functionality of the pipeline 900 is similar to the pipeline 400. For example, the pipeline 900 is configured to process pairs of packets in parallel and the stages 902, 904, 906, 908 are processed via out-of-order execution such that the packet processing is interlaced. As such, while prefetches are being executed for one pair of packets at one stage of the pipeline 900, other pairs of packets are processed at other stages of the pipeline 900. Similar to the pipeline 400 discussed above, in the illustrative embodiment, although the particular operations may vary, non-fetch classification operations 910 and fetch classification operations 912 are performed at each of the classification stages of the pipeline 900.

As shown in FIG. 9, the bucket search pipeline 900 begins with the first stage 902 in which the computing device 100 selects the next two data packets from the burst of received input packets and prefetches packet metadata containing the key and/or the key signature of the data packet similar to the first stage 402 of the bucket search pipeline 400. At the second stage 904, the computing device 100 either reads the key signature from the packet metadata or reads the key and generates the key signature based on the key, and the computing device 100 identifies the hash table bucket 318 corresponding with the key signature and prefetches the identified hash table 316 similar to the second stage 404 of the pipeline 400. Additionally, in the illustrative embodiment, the computing device 100 also sets bit 0 of the key signature to "1" to match only signatures of valid keys from the hash table 316, which is due to the specific data structures 1000 of the hash table buckets 318.

Referring now to FIG. 10, a data structure 1000 for a hash table bucket 318 having configurable key sizes is shown. In the illustrative embodiment, the data structure 1000 includes and 8-byte "next pointer or LRU" field to handle the operations associated with the LUR features or extendible bucket features of a particular bucket 318. In the illustrative embodiment, this field is similar to the corresponding field of the data structures 500, 600 described above. However, in embodiments in which the buckets 318 are extendible, the least significant bit (i.e., bit 0) of this field is set to "1" if the bucket is extended (i.e., there is a pointer to another group of keys) and "0" otherwise to help with branchless implementations. As shown in FIG. 10, the data structure 1000 also stores four 2-byte "bucket signatures" (i.e., "sig 0," "sig 1," "sig 2," and "sig 3"). The corresponding bucket signature stores the fifteen most significant bits (i.e., bits 15-1) of the corresponding key 0-3 if the corresponding key 0-3 is valid or to "0" otherwise. For example, if key 0 is valid, then sig 0 would store the fifteen most significant bits of key 0. The data structure 1000 also stores the key positions (e.g., "key 0 pos," "key 1 pos," etc.) of the corresponding key 0-3, if valid, identifying an index into a key array where the corresponding key 0-3 is stored and an index into a data array where the value associated with the corresponding key 0-3 is stored (i.e., the traffic flow). If the key 0-3 is not valid, the "key # pos" field is undefined. It should be appreciated that the data structure 1000 in the illustrative embodiment is 32 bytes, whereas the key size (i.e., the key array) and the corresponding data size are configurable.

Returning to FIG. 9, at the third stage 906, the computing device 100 reads the signatures from the bucket (i.e., the bucket signatures). As discussed above, in the illustrative embodiment, the bucket signatures are the fifteen most significant bits of the corresponding key. Of course, in other embodiments, the bucket signatures may be otherwise generated (e.g., by another hash function). The computing device 100 compares the input key signature against the four bucket signatures stored in the hash table bucket 318 to identify a signature match. It should be appreciated that, in the worst-case scenario, all four of the bucket signatures may match signature of the input key. Accordingly, in the illustrative embodiment, the computing device 100 prefetches one of the bucket keys from the bucket 318 that matched (i.e., if there are multiple). In the illustrative embodiment, the computing device 100 prefetches the bucket key at the index of the first key that produced a signature match.

At the fourth stage 408, the computing device 100 reads the prefetched bucket key and compares the bucket key to the input key. If there is a match, the computing device 100 prefetches or otherwise retrieves the data associated with the matched bucket key so that the packet may be processed according to the retrieved traffic flow. Similar to the pipeline 400, in LRU embodiments, branchless logic is utilized to update the LRU list in the hash table bucket 318 to identify the matched key as the MRU. Further, in embodiments in which there is entirely branchless logic, a traffic flow may be retrieved even if there is no match and error handling may occur. In the illustrative embodiment, if there are multiple bucket signature matches but the input key did not match the retrieved bucket key, the computing device 100 utilizes an alternative bucket search algorithm (e.g., a non-optimized or traditional search algorithm) for looking up the particular input key.

Figure 11:
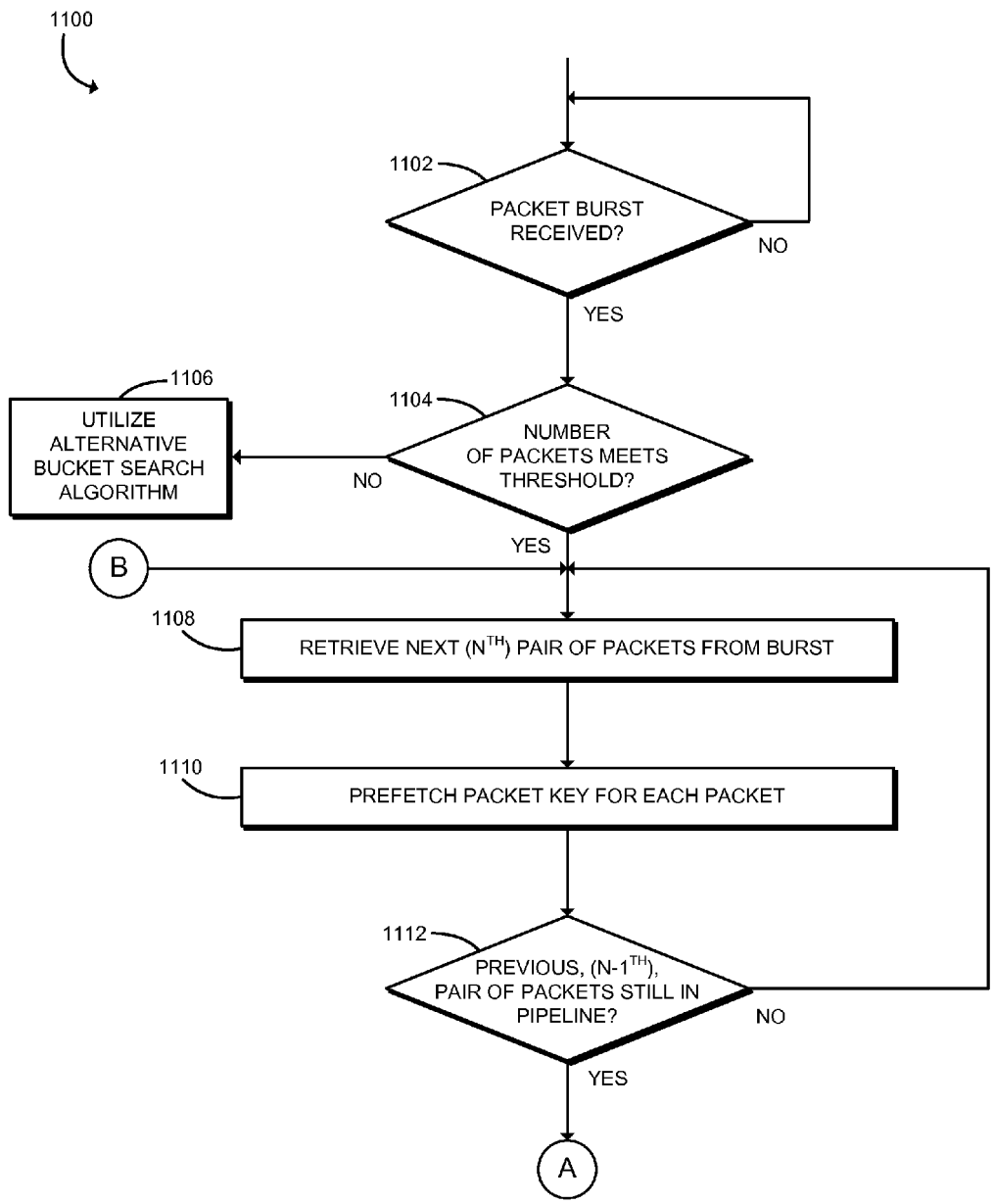
FIGS. 11 and 12 is a simplified flow diagram of at least one other embodiment of a method for packet flow classification that may be executed by the computing device of FIG. 1.
Figure 12:
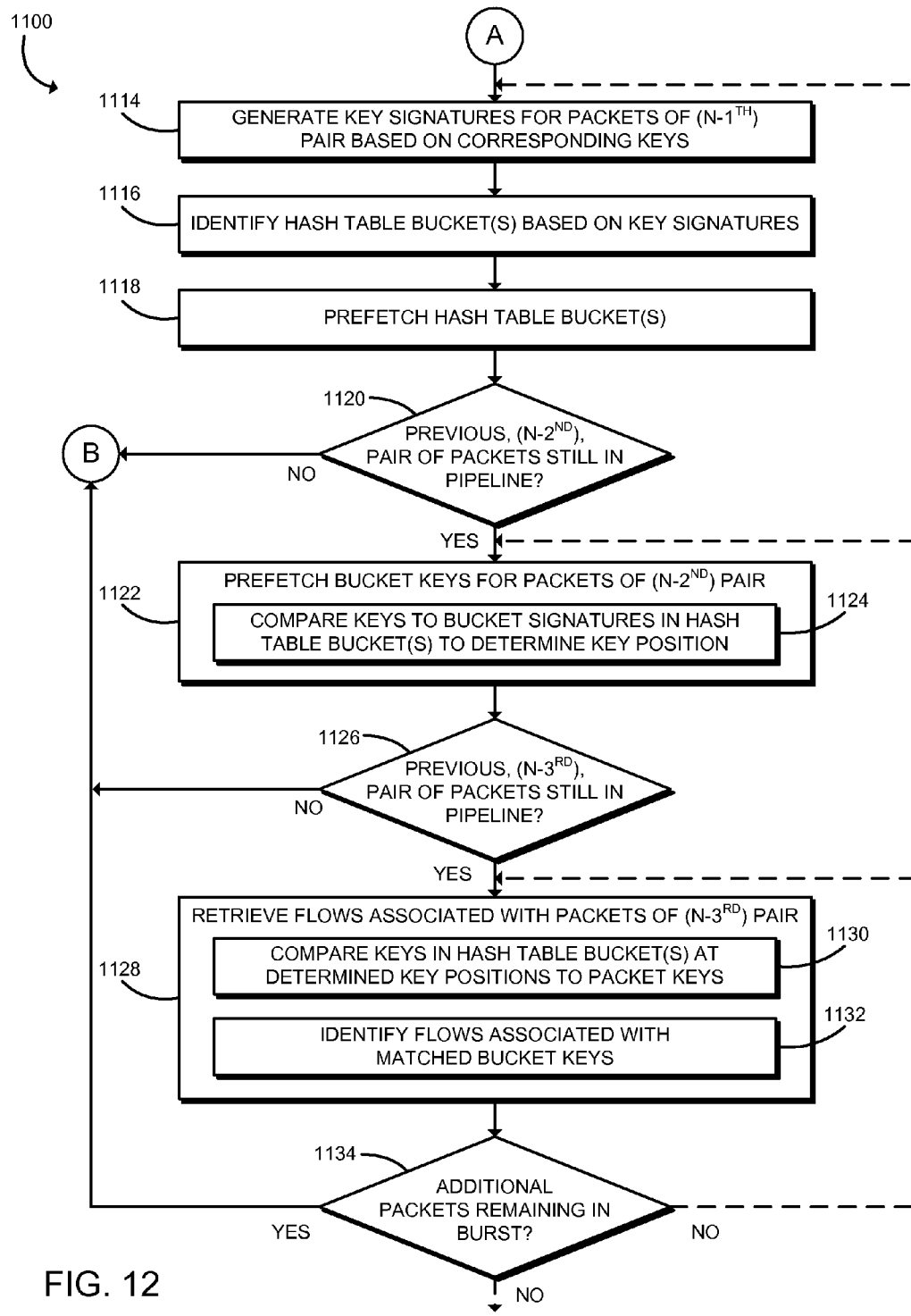

Referring now to FIGS. 11-12, in use, the computing device 100 may execute a method 1100 for packet flow classification. It should be appreciated that, in some embodiments, the illustrative method 1100 corresponds with the bucket search pipeline 900 and begins with block 1102 in which the computing device 100 determines whether a packet burst has been received. If so, the computing device 100 determines whether the number of packets in the packet burst meets a threshold in block 1104. In the illustrative embodiment, the bucket search pipeline 900 is executed only if there are at least seven packets in the burst of input packets. Of course, the threshold may differ in other embodiments. If the number of packets in the packet burst does not meet the threshold (i.e., there are fewer than seven packets in the burst), the computing device 100 utilizes an alternative bucket search algorithm (e.g., a non-optimized or traditional search algorithm) to determine the traffic flow associated with each of the packets in the packet burst in block 1106.

If the number of packets meets the threshold (i.e., there are at least seven packets in the burst), the computing device 100 retrieves the next ($N^{TH}$) pair air of packets from the packet burst in block 1108. As discussed above, the packets of the packet burst are processed through the bucket search pipeline 900 in pairs. In block 1110, the computing device 100 prefetches the packet key for each packet in the pair (e.g., from packet metadata stored in a packet buffer) as described above. In block 1112, the computing device 100 determines whether a previous ($N-1^{TH}$) pair of packets (i.e., a pair of packets that previously entered the pipeline 900) is still in the pipeline 900. In other words, the computing device 100 determines whether there is a pair of packets waiting for execution at the second stage 904 of the pipeline 900. If not, the computing device 100 returns to block 1108 in which the computing device 100 retrieves the next ($N+1^{TH}$) pair of packets from the packet burst.

If the previous pair of packets is still in the pipeline (i.e., at the second stage 904), the method 1100 advances to block 1114 of FIG. 12 in which the computing device 100 generates key signatures for the packets of the ($N-1^{TH}$) pair based on the corresponding keys. As described above, in some embodiments, the key signature may be pre-computed in which the key signature may be read. The computing device 100 identifies the hash table buckets 318 that store the corresponding keys based on the key signatures of the packets in block 1116 and prefetches the hash table buckets 318 in block 1118.

In block 1120, the computing device 100 determines whether a previous ($N-2^{ND}$) pair of packets is still in the pipeline 900. In other words, the computing device 100 determines whether there is a pair of packets waiting for execution at the third stage 906 of the pipeline 900. If not, the computing device 100 returns to block 1108 of FIG. 11 in which the computing device 100 retrieves the next ($N+1^{TH}$) pair of packets from the packet burst. However, if the previous pair of packets is still in the pipeline 900 (i.e., at the third stage 906), the computing device 100 prefetches the bucket keys associated with the packets of the ($N-2^{ND}$) pair in block 1122. As described above, the computing device 100 may compare the packet keys to the bucket signatures stored in the hash table buckets 318 to determine the key positions (i.e., memory locations) in block 1124. As indicated above, the bucket signatures correspond with key positions that identify memory locations at which the retrieve the corresponding bucket keys.

In block 1126, the computing device 100 determines whether a previous ($N-3^{RD}$) pair of packets is still in the pipeline 900. In other words, the computing device 100 determines whether there is a pair of packets waiting for execution at the fourth stage 908 of the pipeline 900. If not, the computing device 100 returns to block 1108 of FIG. 11 in which the computing device 100 retrieves the next ($N+1^{TH}$) pair of packets from the packet burst. However, if the previous pair of packets is still in the pipeline 900 (i.e., at the fourth stage 908), the computing device 100 prefetches or otherwise retrieves the traffic flows associated with the packets of the ($N-3^{RD}$) pair air in block 1128. As discussed above, in doing so, the computing device 100 compares the bucket keys retrieved from the determined key positions to the keys of the input packets in block 1130 and identifies the traffic flows associated with the matched bucket keys in block 1132.

In block 1134, the computing device 100 determines whether there are any additional packets remaining in the packet burst. If so, the method 1100 returns to block 1108 of FIG. 11 in which the computing device 100 retrieves the next pair of packets. It should be appreciated that, in some circumstances, there may be only one remaining packet in which the computing device 100 retrieves that packet and may, for example, process that packet individually rather than as a pair. If there are no additional packets remaining, the method 1100 returns to block 1114, 1122, or 1128 or terminates depending on whether there are any other packets remaining in the pipeline 900 from that packet burst. For example, if packets remain at the second stage 904 for processing, the method 1100 returns to block 1114 in which the computing device 100 generates the key signatures for those packets. If not but packets remain at the third stage 906 for processing, the method 1100 returns to block 1122 in which the computing device 100 prefetches bucket keys for those packets. If not but packets remain at the fourth stage 908 for processing, the method 1100 returns to block 1128 in which the computing device 100 retrieves the flows for those packets. Otherwise, the method 1100 terminates.

EXAMPLES

Illustrative examples of the technologies disclosed herein are provided below. An embodiment of the technologies may include any one or more, and any combination of, the examples described below.

Example 1 includes a computing device for packet flow classification, the computing device comprising a memory to store a hash table including a plurality of hash table buckets, each hash table bucket mapping a plurality of keys to corresponding traffic flows; a flow classification module to perform packet flow classification on received data packets, the packet flow classification comprising a plurality of sequential classification stages, wherein fetch classification operations and non-fetch classification operations are performed in each classification stage, and wherein the fetch classification operations include to (i) prefetch a key of a first received data packet based on a set of packet fields of the first received data packet for use during a subsequent classification stage, (ii) prefetch a hash table bucket from the hash table based on a key signature of the prefetched key for use during another subsequent classification stage, and (iii) prefetch a traffic flow to be applied to the first received data packet based on the prefetched hash table bucket and the prefetched key; and an execution interlacing module to handle processing of received data packets such that a fetch classification operation is performed by the flow classification module on the first received data packet while a non-fetch classification operation is performed by the flow classification module on a second received data packet.

Example 2 includes the subject matter of Example 1, and further including a packet receiving module to receive a set of data packets including the received data packets for packet flow classification.

Example 3 includes the subject matter of any of Examples 1 and 2, and wherein the flow classification module is further to determine whether the set of received data packets meets a threshold number of data packets; and wherein to prefetch the key comprises to prefetch the key in response to a determination that the set of received data packets meets the threshold number.

Example 4 includes the subject matter of any of Examples 1-3, and wherein the non-fetch classification operations include to apply a hash function to the prefetched key to determine the key signature.

Example 5 includes the subject matter of any of Examples 1-4, and wherein the non-fetch classification operations include apply the key signature to the hash table to identify the hash table bucket, each hash table bucket being identifiable by a corresponding key signature.

Example 6 includes the subject matter of any of Examples 1-5, and wherein the non-fetch classification operations include to compare the prefetched key to the plurality of keys of the prefetched hash table bucket to identify a matching key; and wherein to prefetch the traffic flow comprises to prefetch the traffic flow mapped to the matching key.

Example 7 includes the subject matter of any of Examples 1-6, and wherein to prefetch the key comprises to store the key in one of L1 or L2 cache of the computing device.

Example 8 includes the subject matter of any of Examples 1-7, and wherein to prefetch the key comprises to prefetch a first key of the first received data packet based on a set of packet fields of the first received data packet; wherein to prefetch the hash table bucket comprises to prefetch a first hash table bucket based on a key signature of the first prefetched key; wherein the fetch operations include to prefetch a second key of a second received data packet based on a set of packet fields of the second received data packet, the first and second received data packets being received in a same set of received data packets; and wherein the non-fetch operations include to identify a second hash table bucket based on a key signature of the second prefetched key while prefetching the first key.

Example 9 includes the subject matter of any of Examples 1-8, and wherein to prefetch the first key comprises to prefetch the first key with a first execution unit of the computing device; and identify the second hash table bucket comprises to identify the second hash table bucket with a second execution of the computing device different from the first execution unit.

Example 10 includes the subject matter of any of Examples 1-9, and wherein the flow classification module is to perform packet flow classification on the received data packets in pairs of data packets.

Example 11 includes the subject matter of any of Examples 1-10, and wherein the flow classification module is to perform packet flow classification on the received data packets without executing a branch instruction.

Example 12 includes the subject matter of any of Examples 1-11, and wherein each hash table bucket comprises a data structure for storing keys of configurable data sizes.

Example 13 includes the subject matter of any of Examples 1-12, and wherein each hash table bucket comprises a data structure for storing only keys that are one of 8-bytes or 16-bytes in size.

Example 14 includes the subject matter of any of Examples 1-13, and wherein the non-fetch classification operations include to determine a memory location of a bucket key in the hash table bucket based on a signature of the prefetched key; and wherein the fetch classification operations include to prefetch the bucket key from the determined memory location.

Example 15 includes the subject matter of any of Examples 1-14, and wherein the non-fetch classification operations include to (i) compare the prefetched key to the prefetched bucket key (ii) identify a traffic flow mapped to the prefetched bucket key in response to a match between the prefetched key and the prefetched bucket key; and wherein to prefetch the traffic flow comprises to prefetch the identified traffic flow.

Example 16 includes a method for classifying data packet flows by a computing device, the method comprising performing packet flow classification on received data packets, the packet flow classification comprising a plurality of sequential classification stages, wherein fetch classification operations and non-fetch classification operations are performed in each classification stage, and wherein performing the packet flow classification comprises prefetching, by the computing device, a key of a first received data packet based on a set of packet fields of the first received data packet for use during a subsequent stage of packet flow classification while a non-fetch classification operation is performed on another received data packet; prefetching, by the computing device, a hash table bucket based on a key signature of the prefetched key for use during another subsequent classification stage while a non-fetch classification operation is performed on another received data packet, the hash table bucket being prefetched from a plurality of hash table buckets of a hash table, and each hash table bucket mapping a plurality of keys to corresponding traffic flows; and prefetching, by the computing device, a traffic flow to be applied to the first received data packet based on the prefetched hash table bucket and the prefetched key.

Example 17 includes the subject matter of Example 16, and wherein performing the packet flow classification further comprises receiving, by the computing device, a set of data packets including the received data packets for packet flow classification.

Example 18 includes the subject matter of any of Examples 16 and 17, and wherein performing the packet flow classification further comprises determining, by the computing device, whether the set of received data packets meets a threshold number of data packets, wherein prefetching the key comprises prefetching the key in response to determining the set of received data packets meets the threshold number.

Example 19 includes the subject matter of any of Examples 16-18, and wherein performing the packet flow classification further comprises applying, by the computing device, a hash function to the prefetched key to determine the key signature.

Example 20 includes the subject matter of any of Examples 16-19, and wherein performing the packet flow classification further comprises applying the key signature to the hash table to identify the hash table bucket, each hash table bucket being identifiable by a corresponding key signature.

Example 21 includes the subject matter of any of Examples 16-20, and wherein performing the packet flow classification further comprises comparing, by the computing device, the prefetched key to the plurality of keys of the prefetched hash table bucket to identify a matching key; and wherein prefetching the traffic flow comprises prefetching the traffic flow mapped to the matching key.

Example 22 includes the subject matter of any of Examples 16-21, and wherein prefetching the key comprises storing the key in one of L1 or L2 cache of the computing device.

Example 23 includes the subject matter of any of Examples 16-22, and wherein prefetching the key comprises prefetching a first key of the first received data packet based on a set of packet fields of the first received data packet; and prefetching the hash table bucket comprises prefetching a first hash table bucket based on a key signature of the first prefetched key; and wherein performing the packet flow classification further comprises prefetching, by the computing device, a second key of a second received data packet based on a set of packet fields of the second received data packet, the first and second received data packets being received in a same set of received data packets; and identifying, by the computing device, a second hash table bucket based on a key signature of the second prefetched key while prefetching the first key.

Example 24 includes the subject matter of any of Examples 16-23, and wherein prefetching the first key comprises prefetching the first key with a first execution unit of the computing device; and identifying the second hash table bucket comprises identifying the second hash table bucket with a second execution of the computing device different from the first execution unit.

Example 25 includes the subject matter of any of Examples 16-24, and wherein performing the packet flow classification comprises performing the packet flow classification on the received data packets in pairs of data packets.

Example 26 includes the subject matter of any of Examples 16-25, and wherein performing the packet flow classification comprises performing the packet flow classification on the received data packets without executing a branch instruction.

Example 27 includes the subject matter of any of Examples 16-26, and wherein each hash table bucket comprises a data structure for storing keys of configurable data sizes.

Example 28 includes the subject matter of any of Examples 16-27, and wherein each hash table bucket comprises a data structure for storing only keys that are one of 8-bytes or 16-bytes in size.

Example 29 includes the subject matter of any of Examples 16-28, and wherein performing the packet flow classification further comprises determining, by the computing device, a memory location of a bucket key in the hash table bucket based on a signature of the prefetched key; and prefetching, by the computing device, the bucket key from the determined memory location.

Example 30 includes the subject matter of any of Examples 16-29, and wherein performing the packet flow classification further comprises comparing the prefetched key to the prefetched bucket key; and identifying a traffic flow mapped to the prefetched bucket key in response to a match between the prefetched key and the prefetched bucket key, wherein prefetching the traffic flow comprises prefetching the identified traffic flow.

Example 31 includes a computing device comprising a processor; and a memory having stored therein a plurality of instructions that when executed by the processor cause the computing device to perform the method of any of Examples 16-30.

Example 32 includes one or more machine-readable storage media comprising a plurality of instructions stored thereon that, in response to being executed, result in a computing device performing the method of any of Examples 16-30.

Example 33 includes a computing device for packet flow classification, the computing device comprising means for performing packet flow classification on received data packets, the packet flow classification comprising a plurality of sequential classification stages, wherein fetch classification operations and non-fetch classification operations are performed in each classification stage, and wherein the means for performing the packet flow classification comprises means for prefetching, by the computing device, a key of a first received data packet based on a set of packet fields of the first received data packet for use during a subsequent stage of packet flow classification while a non-fetch classification operation is performed on another received data packet; means for prefetching, by the computing device, a hash table bucket based on a key signature of the prefetched key for use during another subsequent classification stage while a non-fetch classification operation is performed on another received data packet, the hash table bucket being prefetched from a plurality of hash table buckets of a hash table, and each hash table bucket mapping a plurality of keys to corresponding traffic flows; and means for prefetching, by the computing device, a traffic flow to be applied to the first received data packet based on the prefetched hash table bucket and the prefetched key.

Example 34 includes the subject matter of Example 33, and wherein the means for performing the packet flow classification further comprises means for receiving a set of data packets including the received data packets for packet flow classification.

Example 35 includes the subject matter of any of Examples 33 and 34, and wherein the means for performing the packet flow classification further comprises means for determining whether the set of received data packets meets a threshold number of data packets; and wherein the means for prefetching the key comprises means for prefetching the key in response to determining the set of received data packets meets the threshold number.

Example 36 includes the subject matter of any of Examples 33-35, and wherein the means for performing the packet flow classification further comprises means for applying a hash function to the prefetched key to determine the key signature.

Example 37 includes the subject matter of any of Examples 33-36, and wherein the means for performing the packet flow classification further comprises means for applying the key signature to the hash table to identify the hash table bucket, each hash table bucket being identifiable by a corresponding key signature.

Example 38 includes the subject matter of any of Examples 33-37, and wherein the means for performing the packet flow classification further comprises means for comparing the prefetched key to the plurality of keys of the prefetched hash table bucket to identify a matching key; and wherein the means for prefetching the traffic flow comprises means for prefetching the traffic flow mapped to the matching key.

Example 39 includes the subject matter of any of Examples 33-38, and wherein the means for prefetching the key comprises means for storing the key in one of L1 or L2 cache of the computing device.

Example 40 includes the subject matter of any of Examples 33-39, and wherein the means for prefetching the key comprises means for prefetching a first key of the first received data packet based on a set of packet fields of the first received data packet; and the means for prefetching the hash table bucket comprises means for prefetching a first hash table bucket based on a key signature of the first prefetched key; and wherein the means for performing the packet flow classification further comprises means for prefetching a second key of a second received data packet based on a set of packet fields of the second received data packet, the first and second received data packets being received in a same set of received data packets; and means for identifying a second hash table bucket based on a key signature of the second prefetched key while prefetching the first key.

Example 41 includes the subject matter of any of Examples 33-40, and wherein the means for prefetching the first key comprises means for prefetching the first key with a first execution unit of the computing device; and the means for identifying the second hash table bucket comprises means for identifying the second hash table bucket with a second execution of the computing device different from the first execution unit.

Example 42 includes the subject matter of any of Examples 33-41, and wherein the means for performing the packet flow classification comprises means for performing the packet flow classification on the received data packets in pairs of data packets.

Example 43 includes the subject matter of any of Examples 33-42, and wherein the means for performing the packet flow classification comprises means for performing the packet flow classification on the received data packets without executing a branch instruction.

Example 44 includes the subject matter of any of Examples 33-43, and wherein each hash table bucket comprises a data structure for storing keys of configurable data sizes.

Example 45 includes the subject matter of any of Examples 33-44, and wherein each hash table bucket comprises a data structure for storing only keys that are one of 8-bytes or 16-bytes in size.

Example 46 includes the subject matter of any of Examples 33-45, and, wherein the means for performing the packet flow classification further comprises means for determining a memory location of a bucket key in the hash table bucket based on a signature of the prefetched key; and means for prefetching the bucket key from the determined memory location.

Example 47 includes the subject matter of any of Examples 33-46, and wherein the means for performing the packet flow classification further comprises means for comparing the prefetched key to the prefetched bucket key; and means for identifying a traffic flow mapped to the prefetched bucket key in response to a match between the prefetched key and the prefetched bucket key, wherein the means for prefetching the traffic flow comprises means for prefetching the identified traffic flow.

The invention claimed is:

1. A computing device for packet flow classification, the computing device comprising:
   a memory to store a hash table including a plurality of hash table buckets, each hash table bucket mapping a plurality of keys to corresponding traffic flows;
   a flow classification module to perform packet flow classification on received data packets, the packet flow classification comprising a plurality of sequential classification stages, wherein fetch classification operations and non-fetch classification operations are performed in each classification stage, and wherein the fetch classification operations include to prefetch a key of a first received data packet based on a set of packet fields of the first received data packet for use during a subsequent classification stage, determine a hash table bucket signature as a function of a key signature of the prefetched key, wherein the function is to provide an even distribution of keys among a plurality of hash table buckets, prefetch the corresponding hash table bucket from the hash table based on the determined hash table bucket signature, for use during another subsequent classification stage, wherein the prefetched hash table bucket includes a plurality of key-value pairs, and prefetch a traffic flow to be applied to the first received data packet based on the prefetched hash table bucket and the prefetched key; and
   an execution interlacing module to handle out of order processing of received data packets such that a fetch classification operation is performed by the flow classification module on the first received data packet of a pair while a non-fetch classification operation is performed by the flow classification module on a second received data packet of the same pair in the same classification stage of a pipeline.

2. The computing device of claim 1, further comprising a packet receiving module to receive a set of data packets including the received data packets for packet flow classification.

3. The computing device of claim 2, wherein the flow classification module is further to determine whether the set of received data packets meets a threshold number of data packets; and
   wherein to prefetch the key comprises to prefetch the key in response to a determination that the set of received data packets meets the threshold number.

4. The computing device of claim 1, wherein the non-fetch classification operations include to apply a hash function to the prefetched key to determine the key signature.

5. The computing device of claim 1, wherein the non-fetch classification operations include apply the key signature to the hash table to identify the hash table bucket.

6. The computing device of claim 1, wherein the non-fetch classification operations include to compare the prefetched key to the plurality of keys of the prefetched hash table bucket to identify a matching key; and
wherein to prefetch the traffic flow comprises to prefetch the traffic flow mapped to the matching key.

7. The computing device of claim 1, wherein to prefetch the key comprises to store the key in one of L1 or L2 cache of the computing device.

8. The computing device of claim 1, wherein to prefetch the key comprises to prefetch a first key of the first received data packet based on a set of packet fields of the first received data packet;
wherein to prefetch the hash table bucket comprises to prefetch a first hash table bucket based on a key signature of the first prefetched key;
wherein the fetch operations include to prefetch a second key of a second received data packet based on a set of packet fields of the second received data packet, the first and second received data packets being received in a same set of received data packets; and
wherein the non-fetch operations include to identify a second hash table bucket based on a key signature of the second prefetched key while prefetching the first key.

9. The computing device of claim 8, wherein to:
prefetch the first key comprises to prefetch the first key with a first execution unit of the computing device; and
identify the second hash table bucket comprises to identify the second hash table bucket with a second execution unit of the computing device different from the first execution unit.

10. The computing device of claim 1, wherein the flow classification module is to perform packet flow classification on the received data packets without executing a branch instruction.

11. The computing device of claim 1, wherein each hash table bucket comprises a data structure for storing keys of configurable data sizes.

12. The computing device of claim 1, wherein each hash table bucket comprises a data structure for storing only keys that are one of 8-bytes or 16-bytes in size.

13. The computing device of claim 1, wherein the non-fetch classification operations include to determine a memory location of a bucket key in the hash table bucket based on a signature of the prefetched key; and
wherein the fetch classification operations include to prefetch the bucket key from the determined memory location.

14. The computing device of claim 13, wherein the non-fetch classification operations include to (i) compare the prefetched key to the prefetched bucket key (ii) identify a traffic flow mapped to the prefetched bucket key in response to a match between the prefetched key and the prefetched bucket key; and
wherein to prefetch the traffic flow comprises to prefetch the identified traffic flow.

15. One or more non-transitory machine-readable storage media comprising a plurality of instructions stored thereon that, in response to execution by a computing device, cause the computing device to:
perform packet flow classification on received data packets, the packet flow classification comprising a plurality of sequential classification stages, wherein fetch classification operations and non-fetch classification operations are performed in each classification stage, and wherein to perform the packet flow classification comprises to:
prefetch a key of a first received data packet of a pair based on a set of packet fields of the first received data packet for use during a subsequent stage of packet flow classification while a non-fetch classification operation is performed on another received data packet of the same pair in the same classification stage of a pipeline to enable out of order processing of the data packets in the pair;
determine a hash table bucket signature as a function of a key signature of the prefetched key, wherein the function is to provide an even distribution of keys among a plurality of hash table buckets;
prefetch the corresponding hash table bucket based on the determined hash table bucket signature, for use during another subsequent classification stage while a non-fetch classification operation is performed on another received data packet, the hash table bucket being prefetched from a plurality of hash table buckets of a hash table, and each hash table bucket mapping a plurality of keys to corresponding traffic flows as key-value pairs; and
prefetch a traffic flow to be applied to the first received data packet based on the prefetched hash table bucket and the prefetched key.

16. The one or more non-transitory machine-readable storage media of claim 15, wherein to perform the packet flow classification further comprises to compare the prefetched key to the plurality of keys of the prefetched hash table bucket to identify a matching key; and
wherein to prefetch the traffic flow comprises to prefetch the traffic flow mapped to the matching key.

17. The one or more non-transitory machine-readable storage media of claim 15, wherein to prefetch the key comprises to store the key in one of L1 or L2 cache of the computing device.

18. The one or more non-transitory machine-readable storage media of claim 15, wherein to:
prefetch the key comprises to prefetch a first key of the first received data packet based on a set of packet fields of the first received data packet; and
prefetch the hash table bucket comprises to prefetch a first hash table bucket based on a key signature of the first prefetched key; and wherein to perform the packet flow classification further comprises to:
prefetch a second key of a second received data packet based on a set of packet fields of the second received data packet, the first and second received data packets being received in a same set of received data packets; and
identify a second hash table bucket based on a key signature of the second prefetched key while prefetching the first key.

19. The one or more non-transitory machine-readable storage media of claim 18, wherein to:
prefetch the first key comprises to prefetch the first key with a first execution unit of the computing device; and
identify the second hash table bucket comprises to identify the second hash table bucket with a second execution unit of the computing device different from the first execution unit.

20. A method for classifying data packet flow by a computing device, the method comprising:
performing packet flow classification on received data packets, the packet flow classification comprising a plurality of sequential classification stages, wherein fetch classification operations and non-fetch classification operations are performed in each classification stage, and wherein performing the packet flow classification comprises:
prefetching, by the computing device, a key of a first received data packet of a pair based on a set of packet fields of the first received data packet for use during a subsequent stage of packet flow classification while a non-fetch classification operation is performed on another received data packet of the same pair in the same classification stage of a pipeline to enable out of order processing of the data packets in the pair;
determining, by the computing device, a hash table bucket signature as a function of a key signature of the prefetched key, wherein the function is to provide an even distribution of keys among a plurality of hash table buckets;
prefetching, by the computing device, the corresponding hash table bucket based the determined hash table bucket signature, for use during another subsequent classification stage while a non-fetch classification operation is performed on another received data packet, the hash table bucket being prefetched from a plurality of hash table buckets of a hash table, and each hash table bucket mapping a plurality of keys to corresponding traffic flows as key-value pairs; and
prefetching, by the computing device, a traffic flow to be applied to the first received data packet based on the prefetched hash table bucket and the prefetched key.

21. The method of claim 20, wherein performing the packet flow classification further comprises comparing, by the computing device, the prefetched key to the plurality of keys of the prefetched hash table bucket to identify a matching key; and
wherein prefetching the traffic flow comprises prefetching the traffic flow mapped to the matching key.

22. The method of claim 20, wherein prefetching the key comprises storing the key in one of L1 or L2 cache of the computing device.

23. The method of claim 20, wherein:
prefetching the key comprises prefetching a first key of the first received data packet based on a set of packet fields of the first received data packet; and
prefetching the hash table bucket comprises prefetching a first hash table bucket based on a key signature of the first prefetched key; and wherein performing the packet flow classification further comprises:
prefetching, by the computing device, a second key of a second received data packet based on a set of packet fields of the second received data packet, the first and second received data packets being received in a same set of received data packets; and
identifying, by the computing device, a second hash table bucket based on a key signature of the second prefetched key while prefetching the first key.

24. The method of claim 23, wherein:
prefetching the first key comprises prefetching the first key with a first execution unit of the computing device; and
identifying the second hash table bucket comprises identifying the second hash table bucket with a second execution of the computing device different from the first execution unit.

* * * * *